(12) United States Patent
Masia et al.

(10) Patent No.: US 11,130,871 B2
(45) Date of Patent: Sep. 28, 2021

(54) HIGH PERFORMANCE COATINGS FOR BUILDING PANELS

(71) Applicant: ARMSTRONG WORLD INDUSTRIES, INC., Lancaster, PA (US)

(72) Inventors: Steven L. Masia, Lancaster, PA (US); Michelle X. Wang, Lititz, PA (US); Kenneth G. Caldwell, Mountville, PA (US)

(73) Assignee: AWI Licensing LLC, Wilmington, DE (US)

( * ) Notice: Subject to any disclaimer, the term of this patent is extended or adjusted under 35 U.S.C. 154(b) by 354 days.

(21) Appl. No.: 15/637,997

(22) Filed: Jun. 29, 2017

(65) Prior Publication Data

US 2018/0002531 A1 Jan. 4, 2018

Related U.S. Application Data

(60) Provisional application No. 62/356,154, filed on Jun. 29, 2016, provisional application No. 62/468,707, filed on Mar. 8, 2017.

(51) Int. Cl.
*C09D 5/03* (2006.01)
*C09D 5/16* (2006.01)
(Continued)

(52) U.S. Cl.
CPC .............. *C09D 5/033* (2013.01); *C08J 7/043* (2020.01); *C08J 7/0427* (2020.01); *C08J 7/08* (2013.01);
(Continued)

(58) Field of Classification Search
CPC ...... C09D 5/1625; C09D 5/1637; C09D 7/40; C09D 5/14; C09D 5/16; C09D 5/033;
(Continued)

(56) References Cited

U.S. PATENT DOCUMENTS

| 5,334,631 A | 8/1994 | Durand |
| 6,863,974 B2 | 3/2005 | Shah et al. |

(Continued)

FOREIGN PATENT DOCUMENTS

| EP | 0404752 A1 | 12/1990 |
| EP | 0525870 B1 | 9/1994 |

(Continued)

OTHER PUBLICATIONS

Chemours, Capstone FS-66 Technical Information, Nov. 2016, pp. 1-2 (Year: 2016).*

(Continued)

*Primary Examiner* — Samir Shah
(74) *Attorney, Agent, or Firm* — Craig M. Sterner

(57) ABSTRACT

The present invention is directed to dirt and anti-microbial resistant articles that include a substrate, a powder coating applied to the substrate, the powder coating may include a cross-linked polymeric binder. The powder coating may include a blend of metal borate and a sulfur-containing benzimidazole compound, wherein the metal borate and sulfur-containing benzimidazole compound are present in a weight ratio ranging from about 75:1 to about 10:1. The powder coating may include fluorosurfactant and a fluorosurfactant may be applied to the powder coating in an amount ranging from about 0.01 g/m$^2$ to about 4 g/m$^2$. The powder coating may be formed using a liquid-based fluorosurfactant.

5 Claims, 5 Drawing Sheets

(51) Int. Cl.
| | |
|---|---|
| *C09D 5/14* | (2006.01) |
| *C08J 7/04* | (2020.01) |
| *C08J 7/043* | (2020.01) |
| *C09D 7/40* | (2018.01) |
| *B29C 71/02* | (2006.01) |
| *C08K 5/02* | (2006.01) |
| *C08K 9/04* | (2006.01) |
| *E04C 2/02* | (2006.01) |
| *C09D 133/16* | (2006.01) |
| *C08L 33/16* | (2006.01) |

(52) U.S. Cl.
CPC .................. *C08K 5/02* (2013.01); *C08K 9/04* (2013.01); *C09D 5/14* (2013.01); *C09D 5/16* (2013.01); *C09D 5/1625* (2013.01); *C09D 5/1637* (2013.01); *C09D 7/40* (2018.01); *E04C 2/02* (2013.01); *C08G 2150/20* (2013.01); *C08K 2201/016* (2013.01); *C08L 33/16* (2013.01); *C09D 133/16* (2013.01)

(58) Field of Classification Search
CPC .......... C09D 133/16; C08K 5/02; C08K 9/04; C08K 2201/016; E04C 2/02; C08J 7/08; C08J 7/0427; C08G 2150/20
See application file for complete search history.

(56) References Cited

U.S. PATENT DOCUMENTS

| | | | |
|---|---|---|---|
| 7,597,939 B2 | 10/2009 | Hennessey et al. | |
| 7,601,401 B2 | 10/2009 | Hennessey | |
| 2002/0001677 A1* | 1/2002 | Dumain | C08G 18/4263 427/384 |
| 2003/0060558 A1* | 3/2003 | Lin | C08J 3/005 524/501 |
| 2003/0087103 A1* | 5/2003 | Belmares | C09D 127/12 428/421 |
| 2005/0058689 A1 | 3/2005 | McDaniel | |
| 2013/0090417 A1 | 4/2013 | Lin et al. | |

FOREIGN PATENT DOCUMENTS

| | | | |
|---|---|---|---|
| EP | 0982120 | 3/2000 | |
| WO | 200220676 A1 | 3/2002 | |
| WO | WO 02/24817 A1 | 3/2002 | |
| WO | WO-2012145078 A1 * | 10/2012 | ............... C09D 7/63 |
| WO | 2014029769 | 2/2014 | |
| WO | WO 2016/209758 A1 | 12/2016 | |

OTHER PUBLICATIONS

International Search Report for Corresponding PCT/US2017/040051, dated Oct. 11, 2017. WO.

EPO Search Report for Related Application No. EP 17821267.6, dated Jan. 27, 2020.

Chinese Search Report for Corresponding Patent No. 2017800409759 dated Aug. 7, 2020.

* cited by examiner

HIGH PERFORMANCE COATINGS FOR BUILDING PANELS

CROSS-REFERENCE TO RELATED APPLICATIONS

This application claims the benefit of U.S. Provisional Application No. 62/356,154, filed on Jun. 29, 2016. This application also claims the benefit of U.S. Provisional Application No. 62/468,707, filed on Mar. 8, 2017. The disclosures of the above applications are incorporated herein by reference.

BACKGROUND

It is known that certain fluoro-carbon containing polymers and siloxane containing polymers may be able to add dirt-resistant properties to paints and other solvent-based coatings. Previously, large quantities of such fluoro-carbon and siloxane containing polymers were required by the overall formulation—to obtain the desired dirt-resistant properties in the resulting coating. However, increasing the amount of fluoro-carbon and/or siloxane containing polymers in such formulation inhibits the bonding strength of the coating to the underlying substrate or surface. As such, the resulting balance between the dirt-resistant properties of the exposed surface of the coating and the coatings ability to adhere to the underlying substrate was undermined. Thus, there exists a need to provide dirt-resistant coatings—specifically soil and dirt repellant coatings—that achieve the desired exposed surface repellency, while not undermining the bond strength to the underlying substrate. A powder coating system can benefit from such dirt-resistant properties, but unlike typical paints and coatings, it has additional constraints that it is desirable to be a solvent free system.

Additionally, microbial growth—including both fungus and bacteria—on indoor and outdoor surfaces is a major environmental concern today affecting home, work and recreational environments. Not only can such microbial growth be unsightly on exposed surfaces, it can destroy underlying substrate materials if left untreated, causing severe damage to buildings and other structures and equipment. Over the past few years it has become increasingly apparent that exposure to certain bacteria and fungi (or their spores) can seriously impact the health of humans, pets and other animals. Previous attempts at imparting antimicrobial properties to a building panel included applying an antimicrobial coating to a surface of a building material. However, such previous antimicrobial coatings required relatively large amounts of antimicrobial additives to impart sufficient antimicrobial activity to the coating—thereby making such coatings expensive as well as potentially interfering with aesthetic properties of the coating. Additionally, such coatings were required to be applied in a wet-state using some type of solvent—thereby eliminating the possibility of application to limited number of substrates. Thus, the need exists for a coating that can exhibit adequate antimicrobial performance with reduced amounts of antimicrobial additive. There also exists the need for such antimicrobial coatings that may be applied without the need of a solvent.

BRIEF SUMMARY

The present invention is directed to an article comprising: a substrate; a polymeric powder coating applied to the substrate, the polymeric powder coating having an upper surface opposite a lower surface; and a top-coating applied to the upper surface of the polymeric powder coating, the top-coating comprising a fluoro-containing repellent component that is present atop the upper surface of the polymeric powder coating in an amount ranging from about 0.01 g/m$^2$ to about 4 g/m$^2$.

Other embodiments of the present invention include a method for forming a dirt-repellent article comprising: a) providing a substrate having a powder coating applied thereto, b) applying a liquid-based coating composition to the powder coating, the liquid-based coating composition comprising a fluorosurfactant and a liquid carrier; and c) drying the liquid-based coating composition, thereby driving off the liquid carrier to form the dirt-repellant article.

Other embodiments of the present invention include an article comprising a substrate; a powder coating applied to the substrate, the powder coating having an upper surface opposite a lower surface and comprising a first fluorosurfactant; and a second fluorosurfactant that is different from the first fluorosurfactant applied to the upper surface of the powder coating.

Other embodiments of the present invention include a method of forming a dirt repellant article comprising a) blending a mixture comprising liquid carrier, an anionic fluorosurfactant, and a polymer binder; b) subsequently drying the mixture to form a powder coating precursor mixture that is substantially free of liquid carrier, c) followed by applying the powder coating precursor mixture to a substrate; and d) subsequently curing the powder coating precursor mixture to form the dirt repellant article, wherein the blending of step a) is performed at a temperature below the melt temperature of the anionic surfactant and the polymeric binder.

Other embodiments of the present invention include a method of forming a dirt repellant article comprising a) blending a mixture comprising liquid carrier, an anionic fluorosurfactant, and a polymer binder for a first time period followed by ceasing to blend the mixture for a second time period to complete a blend cycle, b) repeating the blend cycle, c) drying the mixture to form a powder coating precursor mixture that is substantially free of liquid carrier, wherein the ratio of the first time period to the second time period ranges from about 1:1 to about 1:20.

In other embodiments, the present invention includes an antimicrobial building panel comprising a substrate, a powder coating applied to the substrate, the powder coating comprising a cross-linked polymeric binder and a blend of metal borate and a sulfur-containing benzimidazole compound, wherein the metal borate and sulfur-containing benzimidazole compound are present in a weight ratio ranging from about 75:1 to about 10:1.

Other embodiments of the present invention include an antimicrobial building panel comprising a substrate, a powder coating applied to the substrate, the powder coating comprising a cross-linked polymeric binder, a blend of metal borate and a sulfur-containing benzimidazole compound, wherein the blend is present in a total amount ranging from about 5 parts by weight to about 15 parts by weight based on 100 parts by weight of the powder coating.

Other embodiments of the present invention include a method of forming an antimicrobial building panel comprising a) applying a powder coating precursor to a substrate; and b) curing the powder coating precursor to form a cross-linked powder coating atop the substrate, wherein the powder coating precursor comprises a polymer resin, cross-linker, a metal borate, and a sulfur-containing benzimidazole compound, and the powder composition has a solids content of about 100%.

Other embodiments of the present invention include an antimicrobial coating composition comprising a polymeric resin, a cross-linker; and a blend of metal borate and a sulfur-containing benzimidazole compound, wherein the metal borate and sulfur-containing benzimidazole compound are present in a weight ratio ranging from about 75:1 to about 10:1.

Other embodiments of the present invention include an antimicrobial coating composition comprising a polymeric resin, a cross-linker; and a blend of metal borate and a sulfur-containing benzimidazole compound, wherein the blend is present in a total amount ranging from about 5 parts by weight to about 15 parts by weight based on 100 parts by weight of the antimicrobial coating composition.

In other embodiments, the present invention includes an article comprising a substrate; a powder coating having an upper surface opposite a lower surface, the lower surface facing the substrate; and a cationic fluorosurfactant applied to the upper surface of the powder coating; wherein the powder coating is formed from a precursor comprising polymeric binder, cross-linker, anionic fluorosurfactant, and liquid-carrier.

Other embodiments of the present invention include an anti-soiling article comprising a composition that includes a powder coating and a fluoro-containing repellent component, wherein the powder coating is formed from polymer resin, cross-linker and anionic fluorosurfactant that is different from the fluoro-containing repellent component.

An article comprising a powder coating applied to a substrate, the powder coating formed from a precursor comprising polymeric resin, cross-linker, and a blend of liquid carrier and fluoro surfactant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
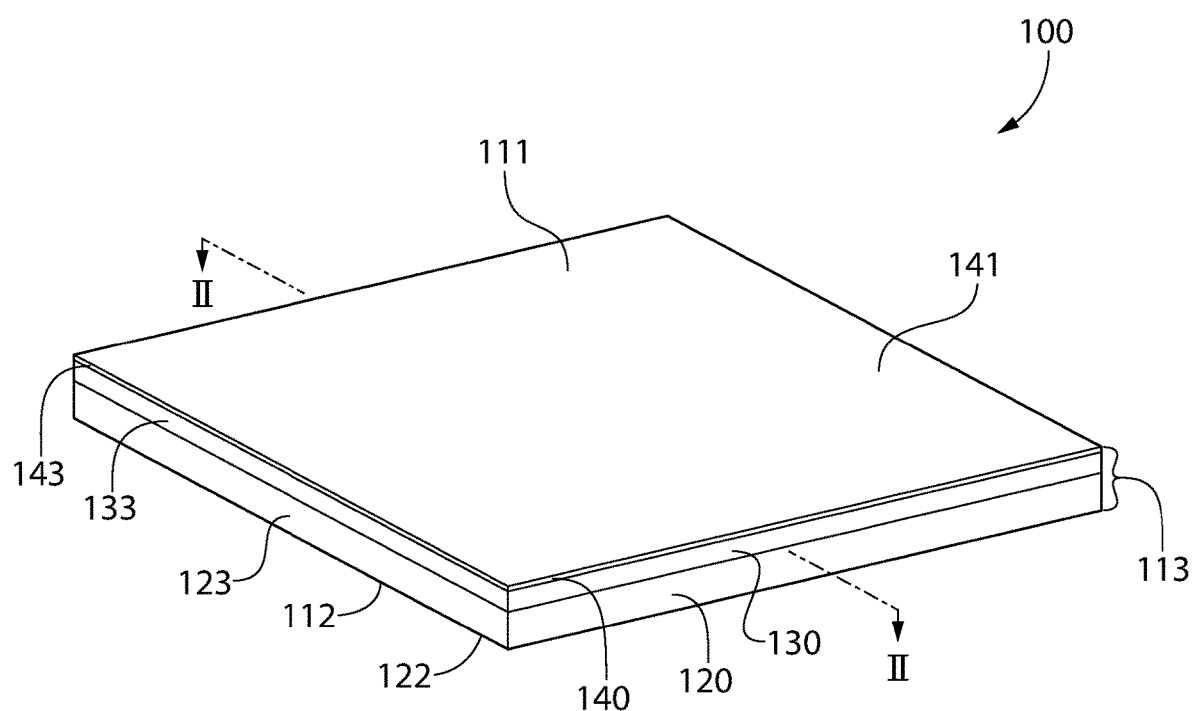
FIG. 1 is perspective view of an article according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

The present invention is directed to an article having one or more dirt-repellant and/or anti-microbial surfaces present on a three-dimensional object, which is formed by applying one or more coatings to a surface of a three-dimensional substrate. The substrate that forms the article of the present invention is not limited in any way other than it being a three-dimensional object that can retain its shape at temperatures up to about 210° C. for a period of at least 5 minutes. Non-limiting examples of the article include building panels, air vents, doors, window covers (e.g., blinds), as well as other surfaces of a car, train, or home, and the like. Although not limited to, the present application will refer to the article as a building panel. Of course, the article of the present application is not limited to building panels as the three-dimensional object.

Referring to FIG. 1, the building panel 100 of the present invention may comprise a first major surface 111 opposite a second major surface 112. The building panel 100 may further comprise a side surface 113 that extends between the first major surface 111 and the second major surface 112, thereby defining a perimeter of the building panel 100.

Figure 4:
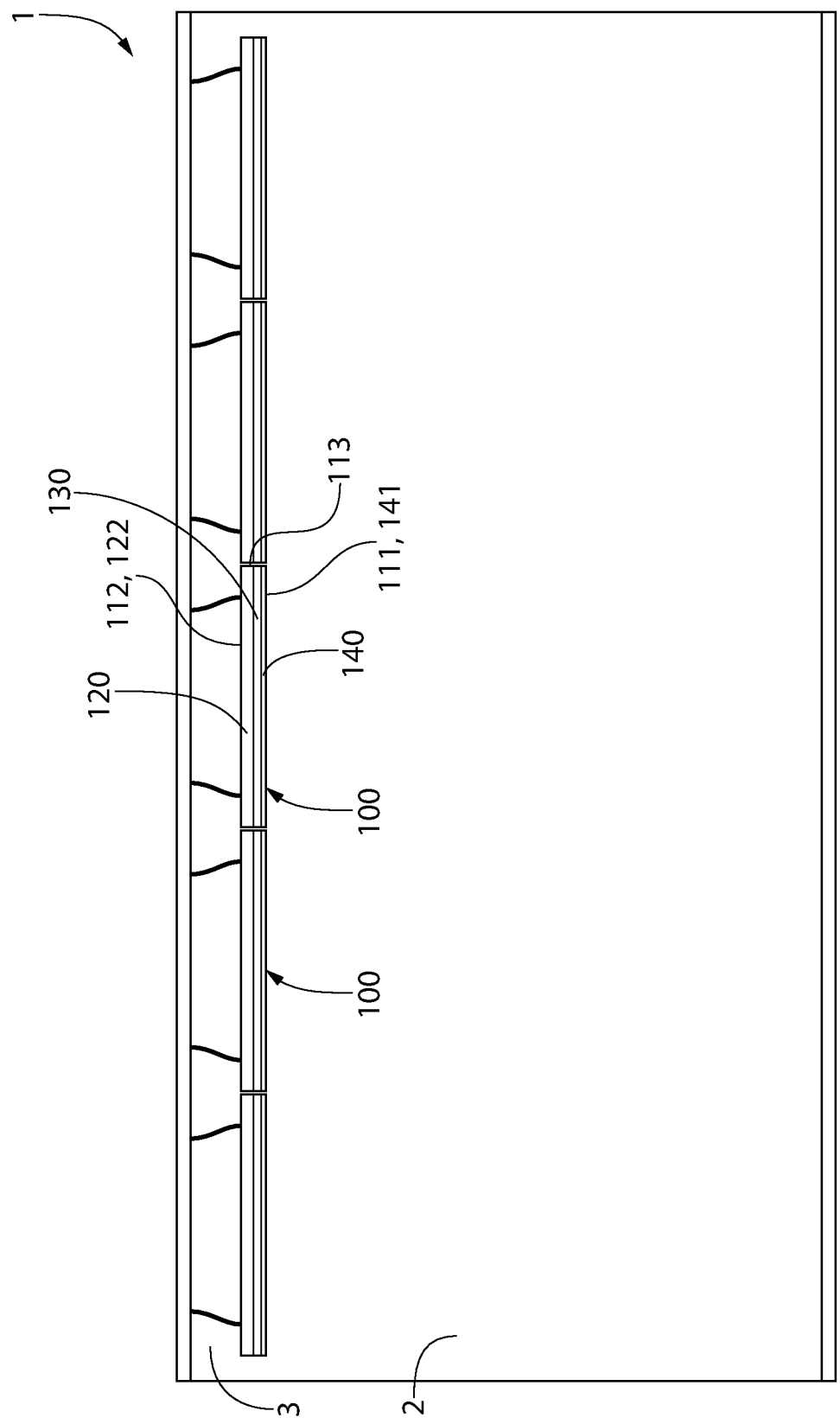
FIG. 4 is a building system comprising the article panel of the present invention.

Referring to FIG. 4, the present invention may further include a ceiling system 1 comprising one or more of the building panels 100 installed in an interior space, whereby the interior space comprises a plenary space 3 and an active room environment 2. The plenary space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.). In the installed state, the first major surface 111 of the building panel 100 faces the active room environment 2 and the second major surface 112 of the building panel 100 faces the plenary space 3.

Figure 2:
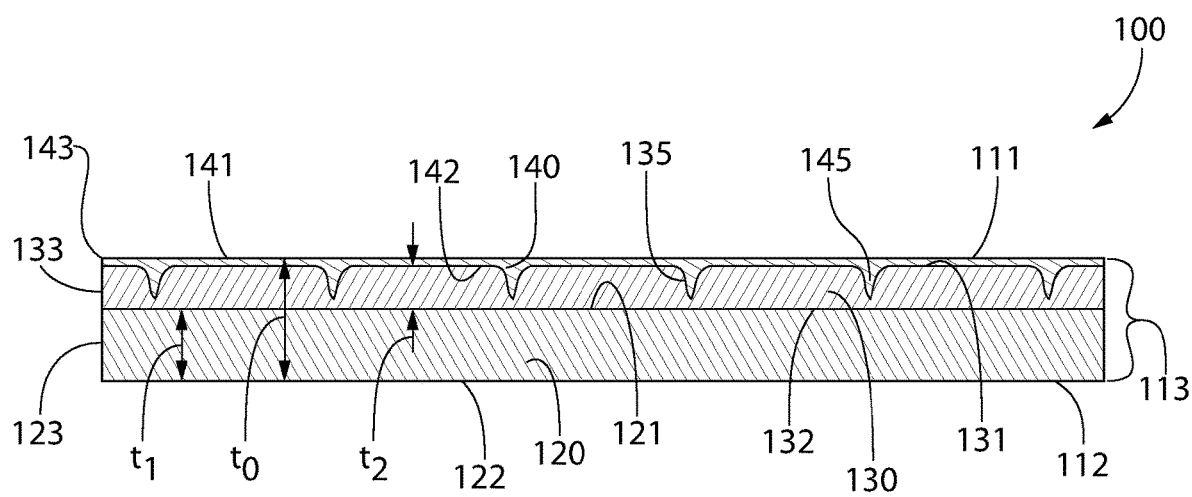
FIG. 2 is a cross-sectional view of the article according to the present invention, the cross-sectional view being along the II line set forth in FIG. 1.
Figure 3:
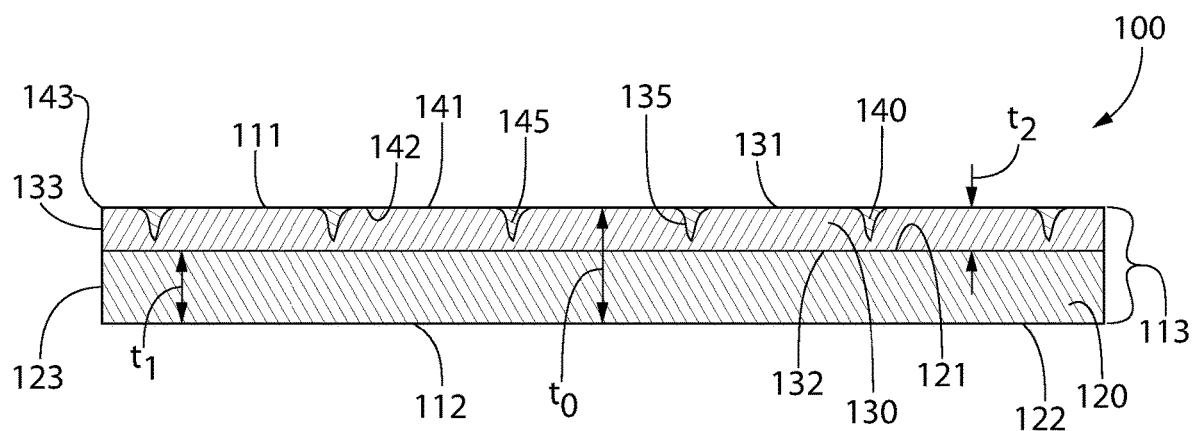
FIG. 3 is a cross-sectional view of the article according to other embodiments of the present invention, the cross-sectional view being along the II line set forth in FIG. 1.

Referring now to FIGS. 1-3, the building panel 100 of the present invention may have a panel thickness to as measured from the first major surface 111 to the second major surface 112. The panel thickness to may range from about 5 mm to about 50 mm—including all values and sub-ranges there-between. The building panel 100 may have a length ranging from about 30 cm to about 190 cm—including all values and sub-ranges there-between. The building panel 100 may have a width ranging from about 1 cm to about 121 cm—including all values and sub-ranges there-between.

Referring now to FIGS. 2 and 3, the building panel 100 may comprise a substrate 120 having an upper surface 121 opposite a lower surface 122 and a substrate side surface 123 that extends between the upper surface 121 and the lower surface 122, thereby defining a perimeter of the substrate 120. The substrate 120 may have a substrate thickness $t_1$ that extends from the upper surface 121 to the lower surface 122 of the substrate 120. The substrate thickness $t_1$ may range from about 5 mm to about 50 mm—including all values and sub-ranges there-between.

The substrate 120 may be metallic, plastic, ceramic, a composite material, or a combination thereof. In some embodiments, the metallic substrate may be an aluminum panel or a steel panel (including galvanized steel). According to some embodiments, the metallic substrate may be selected from materials such as iron, steel, aluminum, tin, and alloys thereof. The substrate 120 may comprise any suitable dimensions suitable for building panel applications. The substrate may comprise any suitable dimensions suitable for building panel applications.

The building panel 100 may comprise a first coating 130 having an upper surface 131 opposite a lower surface 132 and a first coating side surface 133 that extends between the upper surface 131 and the lower surface 132, thereby defining a perimeter of the first coating 130. The first coating 130 may have a first coating thickness $t_2$ that extends from the upper surface 131 to the lower surface 132 of the first coating 130. The first coating thickness $t_2$ may range from about 50 µm to about 120 µm—including all values and sub-ranges there-between.

The first coating 130 may be applied directly to the upper surface 121 of the substrate 120. Specifically, the lower surface 132 of the first coating may be in contact and bonded to the upper surface 121 of the substrate 120. In other embodiments, there may be one or more intervening coatings or layers between the substrate 120 and the first coating 130 (not pictured).

The first coating 130 may be a powder coating comprising at least one polymeric binder and optionally one or more additives—as discussed further herein as "polymeric powder coating." The first coating 130 may also be referred to herein at an intermediate coating. The first coating 130 may comprise surface imperfections 135—such as depression, channels, pores, cracks, pin-holing, etc.—that extend from the upper surface 131 toward the lower surface 132 of the first coating 130, thereby creating voids on the first coating 130. Specifically, the surface imperfections 135 may extend to a depth ranging from about 1% to about 99% of the first coating thickness $t_2$ as measured from the upper surface 131 toward the lower surface 132 of the first coating 130—including all percentages and sub-ranges there-between.

The building panel 100 may comprise a second coating 140 having an upper surface 141 opposite a lower surface 142 and a second coating side surface 143 that extends between the upper surface 141 and the lower surface 142, thereby defining a perimeter of the second coating 140. The second coating 140 may be applied as liquid-based coating comprising at least one fluorosurfactant and/or fluoropolymer and liquid carrier—as discussed further herein. The second coating 140 may also be referred to herein as a "topcoat."

Referring now to FIG. 2, the second coating 140 may be applied directly to the upper surface 131 of the first coating 130 to form a continuous second coating 140. Specifically, the lower surface 142 of the second coating may be in contact and bonded to the upper surface 131 of the first coating 130. The first coating 130 may form the intermediate coating between the second coating 140 and the substrate 120.

The second coating 140 may comprise filling portions 145 that extend downward and beyond the lower surface 142 of the second coating 140 thereby filling the voids created by the surface imperfections 135 of the first coating 130—as discussed further herein. The second coating 140 may be substantially continuous, thereby forming a substantially continuous topcoat on the building panel 100. The second coating 140 atop the first coating 130 may at least partially seal the surface imperfections 135 that exist on the first coating 130 to provide a first major surface 111 that is relatively smoother than the upper surface 131 of the first coating 130. According to this embodiment, the first major surface 111 of the building panel 100 comprises the upper surface 141 of the second coating 140 (and the second major surface 112 of the building panel 100 may comprise the lower surface 122 of the substrate 120).

Referring now to FIG. 3, in alternative embodiments, the second coating 140 may be applied directly to the upper surface 131 of the first coating 130 to form a discontinuous second coating 140. Specifically, the lower surface 142 of the second coating may be in contact and bonded to the upper surface 131 of the first coating 130 and the first coating 130 may form a partial intermediate coating between the second coating 140 and the substrate 120. The term "partial intermediate coating" refers to first major surface 111 of the building panel comprising both the upper surface 141 of the discontinuous second coating 140 as well as portions of the upper surface 131 of the first coating 130 exposed by the discontinuities of the second coating 140. The second major surface 112 of the building panel 100 may comprise the lower surface 122 of the substrate 120.

Regarding the composition of the first coating 130, the first coating 130 may be formed from a powder coating precursor, which comprises a high-solids mixture of a binder composition and cross-linker (as referred to herein as "precursor" or "precursor mixture"). The precursor mixture may be cured at an elevated temperature to form the fully cured powder coating, as discussed herein. According to the present invention, the terms "cure" and "cross-link" may be used interchangeably. In some embodiments, the precursor mixture has a solids content of 100% and is substantially free of solvent.

The binder composition may include a polymeric binder that is a polymeric resin capable of reacting with the cross-linker during curing to form a fully cured polymeric matrix composition. According to some embodiments, the polymeric resin of the present invention to have specific material properties, including glass transition temperature, molecular weight, functionality, melt viscosity, and film formation and leveling properties. Without proper consideration to the above references material properties, selecting the undesirable polymeric resin may result in a composition that is unsuitable for powder coatings as the resulting precursor mixture may exhibit poor shelf-life and inadequate flow properties during processing, and the resulting powder coating may exhibit inadequate film formation characteristics rendering the coating inoperable.

The polymeric resin should may comprise at least one polymeric composition having a glass transition temperature (Tg) that is greater than room temperature, preferably at least about 20° C. The polymeric resin may have a Tg that ranges from about 45° C. to about 80° C. The polymeric resin should may comprise at least one polymeric composition having a glass transition temperature (Tg) that is greater than room temperature, preferably at least about 50° C. The polymeric resin may have a Tg that is about 50° C. The polymeric resin may have a Tg that is about 60° C. The polymeric resin may have a Tg that is about 70° C. The polymeric resins may have a processing temperature that ranges from about 90° C. to about 150° C. The term "processing temperature" refers to the temperature of the polymeric resin that may be heated to without initiating crosslinking between the polymeric resin and the cross-linker.

The binder composition may include a polymeric resin that can react with the cross-linker during curing, as discussed herein, thereby forming the fully cured matrix composition. The polymeric resin of the present invention may have specific material properties, including glass transition temperature, molecular weight, functionality, melt viscosity, and film formation and leveling properties. Without proper consideration to the above references material properties, selecting the undesirable polymeric resin may result in a composition that is unsuitable for powder coatings as the resulting precursor mixture may exhibit poor shelf-life and inadequate flow properties during processing, and the resulting powder coating may exhibit inadequate film formation characteristics rendering the coating inoperable.

Selecting a polymeric resin that has Tg that is too low may result in a precursor mixture that cannot resist sintering and agglomeration during storage and/or shipping of the mixture, thereby degrading the shelf-life of the precursor mixture. Conversely, because powder coatings have high solids contents, selecting a polymeric resin that has a Tg that is too high may result in a precursor mixture that does not exhibit adequate flow during processing or leveling properties after application, thereby resulting in an un-evenly applied powder coating composition. The Tg of a polymeric resin can be controlled through the selection of a number of parameters including, but not limited to, molecular weight, type of polymeric backbone, and the degree of crystallinity, as discussed herein.

The flow properties of the polymeric resin are measured by a melt viscosity. At high solids content (preferably 100% solids, free of solvent), the obtaining a low melt viscosity is a consideration to ensure maximum flow of the polymeric resin during processing. As a polymeric resin is processed during mixing and curing (as discussed herein), the polymeric resin begins to react with a curing agent, also referred to as a cross-linker, that is present in the precursor mixture thereby creating a significant increase in viscosity of the precursor mixture as it becomes the fully cured powder coating. Therefore, using a polymeric resin that exhibits a low melt viscosity may help ensure that there is ample time for the precursor mixture to mix and flow through the processing unit (as discussed herein) before the precursor mixture has reacted a degree of cross-linking that approaches the fully cured powder coating. The melt viscosity of a polymeric resin is the result of a number of factors that include: molecular weight, functionality, and type of polymeric backbone, as discussed herein. The specific melt viscosities of the polymeric resin and overall precursor mixture will be discussed herein.

The polymeric resin may comprise at least one polymeric composition having a weight average (Mw) molecular weight that ranges from about 1,500 to 15,000—including all sub-ranges and molecular weights there-between. The polymeric resin may have a weight average (Mw) that ranges from about 15,000 to 30,000—including all sub-ranges and molecular weights there-between. The molecular weight of the polymeric resin may impact the flexibility, impact strength, and processesability of the powder coating (i.e. melt viscosity). Polymeric resins having a greater molecular weight (Mw) may exhibit greater melt viscosities as compared to lower weight (Mw) polymeric resins The polymeric resin may have a molecular weight (Mw) ranging from about 1,500 to about 15,000 has a polydispersity of about 1—including all sub-ranges and molecular weights there-between. Polydispersity is a ratio of weight average (Mw) molecular weight to number average (Mn) molecular weight of a polymeric composition. Having a polydispersity of about 1 may ensure that the physical properties of the resulting powder coating (i.e., flexibility, impact strength) are maximized without sacrificing a desired low melt viscosity of the precursor mixture during processing. The low melt viscosity being suitable when processing at a high solids content (preferably solve-free) precursor mixture, as may be required for the powder coating according to some embodiments of the present invention.

Forming a three-dimensional, cross-linked polymeric network that forms the powder coating of the present invention may require that the polymeric resin comprises a polymer having an average of at least two functional groups that are available to react with functional groups present on the cross-linker. In some embodiments, the polymeric resin may have an average number of functional groups, the average ranging from 2 to 10 functional groups. In some embodiments, the polymeric resin may have a backbone that is linear or branched and the placement of the functional groups will depend on the type of backbone of the polymeric resins. In some embodiments, the polymeric resin is a linear polymer having two to four functional groups positioned at the terminal ends of the polymer. The functional groups of the polymeric resin may be selected from hydroxyl groups, carboxylic acid groups, isocyanate groups, epoxy groups, acrylic groups and a combination thereof. In some embodiments, the functional groups of the polymeric binder may be temporarily blocked as discussed herein.

According to some embodiments of the present invention, the polymeric resin may comprise polymer having a backbone with moieties selected from ester groups, urethane groups, carbonate groups, epoxy groups and a combination thereof.

The polymeric resins and cross-linker react during curing to form a polymer matrix having a crosslink density. The crosslink density of the cross-linked polymer matrix may be reflected by the glass transition temperature of the cross-linked polymer matrix—which may range from about 150° C. to about 300° C.—including all temperatures and sub-ranges there-between.

The binder composition may include a polymeric resin selected from polyester resin, polyurethane resin, epoxy resin, and polyester-urethane acrylate resin. Suitable polyester resins may be hydroxyl-functional (OH) or carboxyl-functional (COOH). The polyester resin may be the reaction product of a polycarboxylic acid and a polyol. For the purposes of this invention, the term polycarboxylic acid includes compounds having at least two carboxylic acid groups. For the purposes of this invention, the term polyol includes compounds having at least two hydroxyl groups. For hydroxyl-functional polyester, the polyol is present relative to the polycarboxylic acid in an OH:COOH stoichiometric excess that ranges from 2:1 to 6:1. Excess polyol ensures that all free carboxylic acid groups are consumed while allowing excess hydroxyl groups to remain unconsumed during the esterification reaction. The hydroxyl groups may be present at the terminal ends of the polyester. For carboxyl-functional polyester, the polycarboxylic acid is present relative to the polyol in a COOH:OH stoichiometric excess that ranges from 2:1 to 6:1. Excess polycarboxylic acid ensures that all free hydroxyl groups are consumed while allowing excess carboxylic acid groups to remain unconsumed during the esterification reaction. The carboxylic acid groups may be present at the terminal ends of the polyester.

The condensation reaction of hydroxyl-functional and carboxyl-functional compounds to form the polyester resin may be aided by a catalyst. In some non-limiting embodiments, the catalyst may be selected from N-methylimidazole, diazabicyclo[2,2,2]octane, diazabicyclo[5,4,0]undec-7-ene and pentamethyldiethylenetriamine and mixtures thereof. Other examples of suitable esterification catalyst include tetrabutyl-o-titanate, stannous octoate, p-toluene sulphonic acid, and combinations thereof.

In non-limiting embodiments, the polyol may be a diol, a triol, or a higher-functional polyol having 4-8 hydroxyl groups (e.g. tetrol). In some embodiments, the polyol may be aromatic, cycloaliphatic, aliphatic, or a combination thereof. In some embodiments, the carboxyl-functional compound is dicarboxylic acid, a tricarboxylic acid, a higher functional polycarboxylic acid having 4-8 carboxylic acid groups, or a combination thereof. In some embodiments, the polycarboxylic acid may be aliphatic, cycloaliphatic, aromatic, or a combination thereof.

Non-limiting examples of polyol may include a diol that is selected from alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediols including 1,4-butanediol, 1,3-butanediol, and 2-ethyl-1,4-butanediol; pentanediols including trimethyl pentanediol and 2-methylpentanediol; cyclohexanedimethanol; hexanediols including 1,6-hexanediol; hydroxy-alkylated bisphenols; polyether glycols, for example, poly(oxytetramethylene) glycol. In some embodiments, the polyol may be a triol or higher polyol that is selected from trimethylol propane, pentaerythritol, di-pentaerythritol, trimethylol ethane, trimethylol butane, dimethylol cyclohexane, glycerol and the like.

Non-limiting examples of polycarboxylic acid may include a dicarboxylic acid that is selected from adipic acid, azelaic acid, sebacic acid, succinic acid, glutaric acid, decanoic diacid, dodecanoic diacid, phthalic acid, isophthalic acid, 5-tert-butylisophthalic acid, tetrahydrophthalic acid, terephthalic acid, hexahydrophthalic acid, methylhexahydrophthalic acid, dimethyl terephthalate, 2,5-furandicarboxylic acid, 2,3-furandicarboxylic acid, 2,4-furandicarboxylic acid, 3,4-furandicarboxylic acid, 2,3,5-furantricarboxylic acid, 2,3,4,5-furantetracarboxylic acid, cyclohexane dicarboxylic acid, 1,3-cyclohexane dicarboxylic acid, 1,4-cyclohexane dicarboxylic acid, and anhydrides thereof, as well as mixtures thereof. In some embodiments, the polycarboxylic acid may be selected from tricarboxylic acids such as trimellitic acid and anhydrides thereof.

Non-limiting examples of polyurethane resins for the powder coating composition are disclosed, for example, in U.S. Pat. Nos. 4,404,320, and 4,246,380. Suitable polyester-urethane acrylates are disclosed, for example, in U.S. Pat. No. 6,284,321. Suitable epoxy compounds for the powder coating composition are disclosed, for example, in U.S. Pat. No. 5,732,052.

The specific type and amount of reactant used to create the polyester resin may influence the melt viscosity, crystallinity, and Tg of the polymeric resin. Specifically, aromatic and/or cycloaliphatic monomers lead to high Tg polymers, and longer-chain aliphatic monomers lead to lower Tg polymers. For example, a polyester resin having a significant level of ester groups in the backbone that are derived from terephthalic acid/isophthalic acid can have its Tg lowered by replacing certain amounts of the terephthalic acid/isophthalic acid with adipic acid, thereby making the polyester resins more flexible and more likely to flow at a lower temperature. However, substituting too much adipic acid will result in the polyester having a Tg that is too low to be used in powder coating formulations.

In a non-limiting embodiment, the polymeric resin may have 100% solids content (i.e. is free of solvent) and has a melt viscosity ranging from 2,000 mPa/s to 5,000 mPa/s at 200° C.—including all sub-ranges and integers there between. In the non-limiting embodiment, the polymeric resin may have a Tg ranging from about 50° C. to about 70° C. In some embodiments, the polymeric resin may be hydroxyl-functional and have a hydroxyl value ranging from about 40 to about 300. Non-limiting examples of suitable hydroxyl-functional polymeric resin include hydroxyl-functional polyester resin, such as commercially available Polymac 3110 and/or Rucote 102. In some embodiments, the polymeric resin may be carboxyl-functional and have an acid number ranging from 30 to 50.

According to some embodiments of the present invention, the cross-linker comprises at least one low molecular weight compound having at least two functional groups. The cross-linker may comprise between 2 and 6 functional groups. In an alternative embodiment, the cross-linker may comprise between 2 and 4 functional groups. The functional groups of the cross-linker may be selected from hydroxyl groups, carboxylic acid groups, isocyanate groups, epoxy groups, and a combination thereof.

In some non-limiting embodiments, suitable cross-linkers may include the aforementioned polyol compounds, polycarboxylic acid compounds, as well as polyisocyanate compounds and epoxy-functional compounds, such as glycidyl-functional acrylic copolymers. In some embodiments, the functional groups of the cross-linker may be temporarily blocked, as discussed herein, thereby enhancing the shelf-life of the precursor mixture during storage and shipment. The specific functional group will depend on the desired composition of the resulting powder coating.

The specific selection of cross-linker will depend on the type of polymeric resin and the desired final matrix composition. For example, hydroxyl functional polyester may be cured with polycarboxylic acid cross-linker, thereby resulting in a three-dimensional polyester matrix—with the OH:COOH stoichiometric ratio of polyester resin to cross-linker being about 1:1 to ensure all functional groups on both the polymeric resin and cross-linker are consumed during the esterification cross-linking reaction.

The hydroxyl functional polyester may alternatively be cured with polyisocyanate cross-linker, thereby resulting in a polyester-polyurethane matrix. The OH:NCO ratio of polyester resin to polyisocyanate cross-linker being essentially 1:1 to ensure that all functional groups on both the polymeric resin and cross-linker are consumed during the urethane forming cross-linking reaction. For the purposes of this invention, the term polyisocyanate refers to isocyanate-functional compounds having at least two isocyanate functional groups, such as diisocyanate, isocyanurate, biuret, isocyanurate allophanates. In a preferred embodiment, the polymeric resin is the polyester-polyurethane resin.

The polyisocyanate of the present invention may be selected from compounds such as isophorone diisocyanate (IPDI), 4,4'-dicyclohexylmethane-diisocyanate, and trim-ethyl-hexamethylene-diisocyanate, 1,6-hexamethylene diisocyanate, 2,2,4-trimethylhexamethylene diisocyanate, octadecylene diisocyanate and 1,4 cyclohexylene diisocyanate, toluene diisocyanate; methylenediphenyl diisocyanate; tetra methylxylene diisocyanate, and isocyanurates, biurets, allophanates thereof, as well as mixtures thereof, as well as adducts, isocyanurates, biurets, and allophanates thereof. In one embodiment, the polyisocyanate comprises IPDI.

According to some embodiments of the present invention, each of the free isocyanate groups present on the cross-linker may be temporarily blocked with a blocking agent to ensure no premature reacting of the hydroxyl-groups and isocyanate groups occur before final curing—thereby extending the shelf-life of the precursor mixture during storage and shipment. Suitable blocking agents may include, for example, secondary or tertiary alcohols such as isopropanol or tert-butanol; C—H acidic compounds such as malonic dialkyl ester, acetylacetone, and acetoacetic alkyl ester, oximes such as formaldoxime, acetaldoxime, methyl ethyl ketone oxime, cyclohexanone oxime, acetophenone oxime, benzophenone oxime or diethylglyoxime, lactams such as ε-caprolactam, δ-valerolactam, γ-butyrolactam, phenols such as phenol, o-methylphenol; N-alkylamides such as N-methylacetamide, imides such as phthalimide, secondary amines such as diisopropylamine, imidazole, pyrazole, and 1,2,4-triazole. In a preferred embodiment, the cross-linker is ε-caprolactam blocked IPDI.

The blocking agent may be employed relative to the free isocyanate groups in a stoichiometric ratio of about 1:1 to ensure that all free isocyanate groups present on the cross-linker are temporarily blocked. The blocking agent prevents the isocyanate groups from prematurely reacting with moisture or cross-linker at room temperature, but will deblock from the isocyanate group at an elevated temperature of at no more than 170° C., thereby allowing the free isocyanate groups to react with the cross-linker and form a fully cured matrix.

In other embodiments, the blocked polyisocyanate may be in the form of a uretdione modified polyisocyanate. Uretdione modified polyisocyanates contain two free isocyanate groups as well as two internally blocked isocyanate groups. The internal blocking of the isocyanate groups occurs without the need of an external blocking agent, such as ε-caprolactam. At elevated temperatures, the uretdione ring is broken and the two internally blocked isocyanate groups are made available to react with isocyanate-reactive groups, such as hydroxyl groups, in a urethane forming reaction. According to the present invention, the uretdione blocked polyisocyanate may be formed from the above mentioned polyisocyanate compounds—such as IPDI. After deblocking, uretdione based on diisocyanates will contain an equivalent of four isocyanate groups.

In some embodiments, a catalyst may be added to aid the urethane-forming reaction between the hydroxyl groups and the isocyanate groups. The catalyst may be selected from organometallic catalysts, such as dibutyltin dilaurate or tin octoate, or tertiary amines, such as triethylamine, pyridine, N,N-dimethylaminocyclohexane, or 1,4-diazabicyclo[2.2.2] octane. Other catalysts may be selected from metal ion diacryliodium salts. The catalyst may be present in an amount ranging from about 0.001 wt. % to about 1 wt. % based on the total weight of the precursor mixture. This range includes all specific values and sub-ranges there between, such as 0.002, 0.005, 0.01, 0.02, 0.05, 0.1, 0.2, 0.5, and 0.8 wt. % based on the total weight of the precursor mixture.

The polymeric resin may be an isocyanate terminated urethane-polyester prepolymer. The prepolymer may be the reaction product of stoichiometric excess of polyisocyanate relative to hydroxyl-terminated polyester resin, the NCO:OH ratio ranging from 2:1 to 6:1. Excess isocyanate ensures that all free hydroxyl groups are consumed during the formation of the polyurethane prepolymer while ensuring that free isocyanate groups remain on the prepolymer. Any excess polyisocyanate remaining after the formation of the prepolymer may be stripped by low pressure vacuum. The free isocyanate groups present on the prepolymer may be blocked with previously discussed isocyanate blocking agents in a stoichiometric ratio of blocking agent to the free isocyanate of about 1:1 to ensure all free isocyanate groups present on the prepolymer are temporarily blocked. The blocked isocyanate-terminated polyester prepolymer may then be mixed with polyol cross-linker to form a storage stable precursor mixture. The polyol cross-linker comprises the same low molecular weight polyol compounds listed with respect to the formation of the polyester resin.

In some embodiments, carboxyl functional polyester resin may be cured with polyol cross-linker, thereby resulting in a polyester matrix. The free carboxyl groups present on the carboxyl-functional polyester resin may be present relative to the hydroxyl groups present on the cross-linker in a COOH:OH stoichiometric ratio of about 1:1, thereby ensuring that all functional groups present on both the polyester resin and the cross-linker are consumed during the esterification cross-linking reaction. The polyol cross-linker comprises the same low molecular weight polyol compounds listed with respect to the formation of the polyester resin.

The carboxyl functional polyester resin may also be cured with epoxy functional compounds. In some non-limiting embodiments, the epoxy functional compounds may include epoxy resin that may be saturated or unsaturated, aliphatic, cycloaliphatic, aromatic or heterocyclic.

Examples of epoxy resins suitable for use in the invention include polyglycidyl ethers of polyhydric compounds, brominated epoxies, epoxy novolacs or similar polyhydroxyphenol resins, polyglycidyl ethers of glycols or polyglycols, and polyglycidyl esters of polycarboxylic acids. Preferably the epoxy resin is a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A; 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiarybutylphenyl) propane; bis(2-hydroxynapthyl) methane; 1,5-dihydroxynaphthalene; 1,1-bis(4-hydroxy-3-alkylphenyl) ethane and the like.

The binder composition may be substantially free of a volatile solvent, excluding moisture content. For the purposes of this invention, the term "substantially free" means less than 0.1 wt. % based on the total weight of the referenced element. In a non-limiting example, a mixture comprising binder, cross-linker, and filler that is substantially free of solvent comprises solvent in an amount less than 0.05 wt. % based on the total weight of the mixture—preferably less than 0.01 wt. %. According to a preferred embodiment, the binder composition of the present invention has 100% solids is free of solvent—include volatile organic solvents. Furthermore, according to additional embodiments of the present invention, the binder composition is substantially free of polymer resin comprising fluoro-carbon groups, such as fluoro-modified polyurethane and fluoropolymer, e.g., PVDF, or PTFE. Stated otherwise, the polymeric resin, which makes up the binder composition of the present invention, is substantially free of fluoro-carbon groups.

The powder coating may further comprise additives, fillers, coating performance enhancers. Such fillers and additives may include, but are not limited to, inert fillers, antioxidants, stabilizers, pigments, reinforcing agents, reinforcing polymer, lubricants, antimicrobial additive (e.g., fungicides), degassers, a surfactant, flow additives, dispersants, thixotropic agents, adhesion promoters, light stabilizers, flame retardants, anticorrosion agents, inhibitors, leveling agents, anti-cratering agents, and mixtures thereof. In some embodiments, the fungicide may be present in an amount ranging from about 6 wt. % to about 10 wt. % based on the total weight of the powder coating composition. In a non-limiting example, the fungicide may comprise zinc borate, 2-(-4-thiazolyl) benzimidazole.

According to the present invention, the powder coatings comprising an antimicrobial additive may be referred to as an antimicrobial coating or antimicrobial powder coating. The term "antimicrobial", refers to coatings that exhibit resistance to fungi (e.g., mildew, mold) and/or bacterial growth. The antimicrobial coating of the present invention may be the powder coating with or, optionally, without the anti-soiling surfactant.

The antimicrobial coating may be applied directly to one of the surfaces of the substrate. Specifically, the antimicrobial coating may be in contact and bonded to the exposed surface of the substrate. In other embodiments, there may be one or more intervening coatings or layers between the substrate surface and the antimicrobial coating.

The antimicrobial coating may be present on one or more surfaces of the substrate in a coating thickness that ranges from about 40 µm to about 120 µm—including all thickness and sub-ranges there-between. The antimicrobial coating may be present on one or more surfaces of the substrate in a coating thickness that ranges from about 130 g/m² to about 340 g/m²—including all amounts and sub-ranges there-between.

The antimicrobial coating may comprise an antimicrobial additive dispersed throughout a cross-linked polymer. The antimicrobial coating may further comprise one or more pigments. The antimicrobial coating may further comprise one or more other additives and/or fillers. The cross-linked polymer may be formed from a powder coating precursor (also referred to as "precursor"). The precursor may comprise a high-solids mixture of a polymeric resin and cross-linker—as discussed further herein. The cross-linked polymer forms a three-dimensional polymer matrix in which the antimicrobial additive, pigment, fillers, and/or other additives are dispersed throughout—as discussed further herein.

The antimicrobial additive of the present invention includes a blend of a first component and a second component. The first component generally comprises a metal borate and the second component comprises a benzimidazole compound.

According to the present invention, the metal borate of the first component refers to a compound corresponding to basic, dibasic, tribasic and polybasic metal borate(s), and mixtures thereof. For example, "zinc borate" refers to a group of compounds consisting zinc borate ($ZnB_4O_7$), any of the corresponding basic zinc borates (such as monobasic zinc borate of the structure $Zn(OH).B_4O_7$, dibasic basic zinc borate of the structure $2Zn(OH)_2.B_4O_7$, tribasic zinc borate of the structure $3Zn(OH)_3.B_4O_7$ and the like), and mixtures thereof. As another example, "copper borate" refers to a group of compounds selected from the group consisting copper borate ($CuB_4O_7$), any of its the corresponding basic copper borates (such as monobasic copper borate of the structure $Cu(OH).B_4O_7$, dibasic basic copper borate of the structure $2Cu(OH)_2.B_4O_7$, tribasic copper borate of the structure $3Cu(OH)_3.B_4O_7$, and the like), and mixtures thereof. The metal borate may include more than one metal. In a preferred embodiment, the metal borate is zinc borate.

The benzimidazole compound of the second component refers to a compound having the a structure of Formula I:

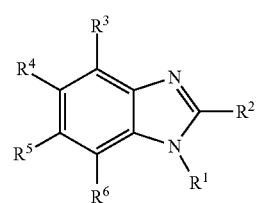

Formula I

Wherein $R^1$, $R^3$, $R^4$, $R^5$, and $R^6$ may be selected from H, a halogen atom (e.g., Br, I, Cl), and C1-C6 chain. R2 may be selected from a sulfur-containing heterocyclic compound—such as thiazolyl group. The benzimidazole compound may have an $R^2$ group that is a 4-thiazolyl group. The benzimidazole compound may have $R^1$, $R^3$, $R^4$, $R^5$, and $R^6$ groups that are hydrogen atoms. In a preferred embodiment, the benzimidazole compound is 2-(4-Thiazolyl)benzimidazole having the structure of Formula II:

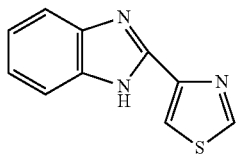

Formula II

In some embodiments, the benzimidazole compound of the present invention may be substantially free of carbonyl groups.

The first component and the second component may be present in the antimicrobial additive resulting in a weight ratio between the first component (metal borate) and the second component (benzimidazole compound) that ranges from about 75:1 to about 10:1—including all ratios and sub-ranges there-between. In some embodiments, the first component and the second component may be present in a weight ratio ranging from about 70:1 to about 30:1—including all ratios and sub-ranges there-between. In a preferred embodiment, the first component and the second component may be present in a weight ratio ranging from about 70:1 to about 40:1—including all ratios and sub-ranges there-between. The first component and the second component may be present in a weight ratio of about 70:1.

The antimicrobial additive of the present invention may be substantially free of compounds comprising carbamate groups. In some embodiments, the antimicrobial additive of the present invention may be substantially free of compounds comprising halogen atoms.

It has been surprisingly discovered that the combination of the metal borate—specifically the zinc borate—and the sulfur-containing benzimidazole compound provides a synergistic improvement in antimicrobial activity to the resulting coating. Specifically, the combination of metal borate and sulfur-containing benzimidazole provides more than adequate antimicrobial properties to the resulting coating at reduced amounts of the antimicrobial additive in the overall coating. Specifically, the antimicrobial additive may be present in the overall antimicrobial coating in an amount ranging up to about 10 wt. % based on the total weight of the antimicrobial coating. In a preferred embodiment, the antimicrobial additive may be present in the overall antimicrobial coating in an amount ranging from about 6 wt. % to about 10 wt. %—including all amounts and sub-ranges there-between—based on the total weight of the antimicrobial coating. With less antimicrobial additive be required in the overall coating, the resulting antimicrobial coating can be manufactured at a lower cost.

The antimicrobial additive may also be present in amounts represented by parts by weight, whereby the antimicrobial additive is present in an amount ranging from about 6 to about 10 parts by weight based on 100 parts by weight of the overall antimicrobial coating composition—including all parts by weight and sub-ranges there-between.

The precursor composition may further comprise reinforcing polymer, such as acrylic copolymers that further comprise functional groups capable of reacting with the functional groups present in the binder. In a non-limiting example, the reinforcing polymer may comprise glycidyl-functional acrylic polymer. As previously discussed, glycidyl groups are capable of reacting with carboxylic acid groups.

Yet further additives include metals and metal oxides such as, for instance, chromium oxide, chromium, zinc oxide, copper oxide, copper, nickel, titanium, stainless steel, aluminum, titanium dioxide, tin oxide, iron, iron oxide, and the like. Such metals may serve, for instance, as abrasion-resistant fillers, compatibilizers, or as pigments. Pigments may further include compounds such as titanium dioxide, barium sulfate, calcium carbonate, or a combination thereof. In some embodiments of the present invention, the pigments may have an average particle size ranging from 180 nm to 220 nm; in a preferred embodiment, the pigment has an average particle size of about 200 nm. In some embodiments, the powder coating according to the present invention may comprise about 15 wt. % to about 30 wt. % of pigment. According to some embodiments, the powder coating according to the present invention may comprise about 20 wt. % of titanium dioxide.

In some embodiments of the present invention, the pigments may have an average particle size ranging from about 0.2 microns ($\mu$m) to about 5 $\mu$m—including all sizes and sub-ranges there-between. The antimicrobial coating may comprise pigment in an amount ranging from about 20 wt. % to about 50 wt. %—including all amounts and sub-ranges there-between—based on the total weight of the antimicrobial coating. In some embodiments, the pigment may be pretreated with the antimicrobial additive before being blended with the precursor and/or other additives and fillers.

Another benefit of the unexpected synergy between the metal borate and sulfur-containing benzimidazole compound is that the antimicrobial composition and precursor (as well as other additives and fillers) may be applied to a substrate at a solids content of about 100%—i.e., substantially free of solvent. Without needing solvent to apply the antimicrobial coating, the antimicrobial coating may be suitable as a powder coating.

The powder coating of the present invention may comprise a surfactant. The surfactant according to the present invention may be added to the precursor mixture in a surfactant composition prior to final processing and curing, as discussed herein. The fluorosurfactant may be non-ionic or ionic. Non-limiting examples of ionic fluorosurfactant include cationic fluorosurfactant and anionic fluorosurfactant. In a preferred embodiment, the fluorosurfactant of the powder coating may be anionic.

The surfactant composition according to the present invention is substantially free of solvent or liquid carrier—preferably having a solid's content of 100% and substantially free of solvent or liquid carrier, including volatile organic solvents and/or water. The surfactant composition is in powder form at room temperature. The surfactant composition comprises at least one fluorosurfactant. In other embodiments, the surfactant composition according to the present invention may be a liquid-based surfactant comprising an anionic fluorosurfactant mixed with a liquid carrier—as discussed in greater detail herein.

The anionic fluorosurfactant may have a melting temperature that ranges from about 50° C. to about 70° C. The anionic fluorosurfactant of the present invention has a low pH value—ranging from about 1 to about 6, including all value and sub-ranges there between. The anionic moiety of the anionic fluorosurfactant may be selected from a sulfate, sulfonate, phosphate, or carboxylate moiety, wherein preferred is a phosphate moiety. Non-limiting examples of the anionic fluorosurfactant includes at least one of the following formulas:

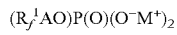  Formula I:

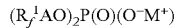  Formula II:

wherein $R_f^1$ is a $C_1$ to $C_{16}$ linear or branched perfluoroalkyl, which may be optionally interrupted by one, two or three ether oxygen atoms.

A is selected from: $(CH_2CF_2)_m(CH_2)_n$; $(CH_2)_oSO_2N(CH_3)(CH_2)_p$; $O(CF_2)_q(CH_2)_r$; or $OCHFCF_2OE$;

m is 0 to 4;

n, o, p, and r, are each independently 2 to 20;

q is 2;

E is a $C_2$ to $C_{20}$ linear or branched alkyl group optionally interrupted by oxygen, sulfur, or nitrogen atoms; a cyclic alkyl group, or a $C_6$ to $C_{10}$ aryl group;

M is a Group I metal or an ammonium cation $(NH_x(R_2)_y)^+$, wherein R2 is a $C_1$ to $C_4$ alkyl; x is 1 to 4; y is 0 to 3; and x+y is 4.

In a preferred embodiment, the fluorosurfactant may consist of the anionic fluorosurfactant of formula III:

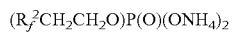  Formula III:

wherein $R_f^2$ is a $C_4$ to $C_8$ perfluoroalkyl group having the formula: $F[CF_2—CF_2]_{3-8}$. In preferred embodiments, the fluorosurfactant is a solvent-free anionic fluorosurfactant. Suitable anionic fluorosurfactants are commercially available.

According to some embodiments, the fluorosurfactant may be present in an amount ranging from about 0.05 wt. % to about 4 wt. % based on the total weight of the powder coating. In a preferred embodiment, the fluorosurfactant may be present in an amount ranging from about 0.7 wt. % to 3 wt. % based on the total weight of the powder coating. In some embodiments, the fluorosurfactant may be present in an amount ranging from about 1.5 wt. % to 3 wt. %, alternatively from about 0.1 wt. % to 0.3 wt. % based on the total weight of the powder coating. According to some embodiments, the fluorosurfactant may be present in an amount ranging from 10 wt. % to 25 wt. % based on the total weight of a pigment—including all sub-ranges and integers there between.

The pigment, e.g., titanium dioxide, may be pretreated with the surfactant composition prior to be added to the precursor mixture. In a preferred embodiment, the pigment is pretreated with anionic fluorosurfactant according to the following steps: heating the anionic fluorosurfactant composition of the present invention to an elevated temperature to melt the anionic fluorosurfactant, which may range from 50° C. to 70° C. (including all integers and sub-ranges there-between), followed by the addition of the titanium oxide. The anionic fluorosurfactant and the pigment are then mixed, thereby creating the pretreated titanium dioxide pigment. In some embodiments, the elevated temperature may be 55° C. The pretreated pigment can be cooled to room temperature and later mixed with the binder and cross-linker to form the precursor mixture, as discussed herein. In a preferred embodiment, the pigment is titanium dioxide that is pretreated with the anionic fluorosurfactant of formula III. It has been found that pretreating the pigment with the fluorosurfactant before the other ingredients of the coating compositions are added to produce the coating composition mixture ensures uniform dispersion of the fluorosurfactant in the coating composition.

The first coating 130 may be formed by first mixing together the binder, cross-linker, and additives (including the anti-microbial additive in the case of antimicrobial coatings), and fillers to form a precursor mixture. The precursor mixture may be lightly mixed at room temperature by a dry blender for a period of time, thereby creating an evenly distribution of binder, cross-linker, and additives/fillers in the precursor mixture. After dry blending, the precursor mixture may be melt-mixed and pelletized according to the discussion herein.

The precursor mixture may then be processed in a melt extruder. The melt extruder may be a single screw or twin-screw extruder. The melt extruder may comprise three zones: (1) a feed zone; (2) a melt zone; and (3) dispersion zone. The feed zone may be held at a temperature that is less than or equal to room temperature to prevent blockages of the precursor mixture. The melt zone is generally heated above the maximum Tg of the precursor mixture but below the de-blocking and reaction temperature of the precursor mixture. Operating between above the Tg and below the de-blocking/reaction temperature allows the precursor mixture to become molten and flow without the precursor mixture prematurely deblocking and reacting inside of the extruder. In the dispersion zone, the temperature is maintained above the Tg and below the deblocking temperature, thereby allowing the precursor mixture to become a uniform. In some embodiments, the melt zone and dispersion zone are operated at a temperature ranging from about 90° C. to 150° C.—including all sub-ranges and integers therebetween. In some embodiments, the melt zone and dispersion zone are operated at a temperature ranging from about 90° C. to about 130° C.—including all sub-ranges and integers there-between. In some embodiments, the melt zone and dispersion zone are operated at a temperature ranging from 100° C. to 110° C. The extruder will comprise a heating means and a cooling means to ensure that the various zones stay within the appropriate temperature ranges.

After passing through the dispersion zone, the melt-mixed precursor mixture passed through an extruder exit die. The exit die may be provided with a plurality of apertures in many different configurations. In some embodiments, the exit die may be replaced by other devices which allow for a pressure drop across them; for example, such a pressure drop could be achieved using a particular screw configuration. In any event, the average residence time of the precursor mixture in the melt extruder will generally be less than 5 minutes and more typically in the range from 30 to 120 seconds. As the molten precursor mixture passes through the die, it is cooled, and pelletized. The pellets are ground and the resulting precursor powder is then collected. In some non-limiting embodiments, the precursor mixture may be ground by machine, such as a grinder, cryogenically grinder, or the like. The resulting precursor powder may have an average particle size of less than 100 μm, typically ranging from 30 to 50 μm.

According to an alternative embodiment of the present invention, the first coating 130 may be produced according to an alternative process. The alternative process includes a liquid-based surfactant. Previously, liquid-based surfactants were not used to in the creation of powder coatings. The liquid based surfactant may comprise a liquid carrier that is pre-mixed with at least one of the previously discussed fluorosurfactants. In a preferred embodiment, the liquid based surfactant comprises a liquid carrier that is pre-mixed with at least one of the previously discussed anionic fluorosurfactants. Non-limiting examples of liquid carrier include water as well as other liquids that are not flammable below 120° C. and/or do not emit toxic vapors below 120° C.

The liquid-based surfactant may comprise liquid carrier in an amount ranging from about 10 wt. % to about 75 wt. % based on the total weight of the liquid carrier and the surfactant in the dry-state—including all amounts and sub-ranges there-between. In a preferred embodiment, the liquid-based surfactant may comprise the liquid carrier in an amount ranging from about 30 wt. % to about 75 wt. % based on the total weight of the liquid carrier and the surfactant in the dry-state—including all amounts and sub-ranges there-between.

The liquid-based surfactant may be blended together with the binder, cross-linker, and additives and/or fillers to form a wet-precursor mixture. The liquid-based surfactant may be present in the wet-precursor mixture in an amount ranging from about 0.05 wt. % to about 4 wt. % based on the total weight of the wet-precursor mixture—including all amounts and sub-ranges there-between.

Alternatively, to ensure proper distribution of each component within the wet-precursor mixture, the blend of liquid-based surfactant may be blended together with the binder, cross-linker, and additives and/or fillers may be mixed together for a number of blending cycles that includes a blending period and a cooling period.

In a non-limiting embodiment, each blending period of a blending cycle may span a first time period ranging from about 5 seconds to about 30 seconds—including all times and sub-ranges there-between. In a non-limiting embodiment, each cooling period of a blending cycle may span a second time period ranging from about 5 seconds to about 120 seconds—including all times and sub-ranges there-between. A ratio between the first time period and the second time period for a single blend cycle may range from about 1:1 to about 1:20—including all ratios and sub-ranges there-between.

In a preferred embodiment, the second time period is greater than the first time period for each blend cycle. In a preferred embodiment, the blend cycle may be less than about 10 seconds to avoid excess heat build-up. A total number of blending cycles may range from about 1 to about 20—including all number of blend cycles and sub-ranges there-between.

The length of each blending cycle and the total number of blending cycles are selected such that the wet-precursor mixture is fully blended without any clumping or any portion of the wet-precursor mixture melting due to heat build-up. Non-limiting examples of suitable blenders include a blend with side scrappers having high heat conduction. In some embodiments, the blender may be a cooled blender that helps regulate the temperature of the wet precursor mixture during blending. The blend cycles and/or blending equipment may be operated such that the wet-precursor never exceeds a temperature of 120° F. during blending. In other embodiments, the blend cycles and/or blending equipment may be operated such that the wet-precursor never exceeds a temperature of 80° F. during blending. During blending, the liquid carrier may become absorbed by one or more components of the precursor mixture (e.g., the pigments), and, therefore the wet-precursor mixture will still comprise the liquid carrier as it may not evaporate off during blending.

By blending the precursor mixture in a wet-state and below the melting temperature of any component within the pre-cursor mixture is that the waxy anionic surfactant is better distributed throughout the precursor mixture—thereby providing greater uniformity of anti-soiling performance in the final coating—even at relatively low amounts of the anionic surfactant. Once blended, the wet-precursor may be dried and pelletized according to the previously discussed methodology. During extrusion, the liquid-carrier may be evaporated off resulting in the precursor having a substantially 100% solids content. In a non-limiting example, the wet-precursor may be extruded at a temperature above 100° C.—preferably between 105° C. and 110° C.—to ensure that the liquid carrier is evaporated from the wet-precursor mixture.

A predetermined amount of the precursor powder may then be placed in a container, which is either placed into storage or shipped to another location for final processing, as discussed herein. In other embodiments, the precursor powder may finally be processed at the same site as the melt-mixing. Final processing includes spray coating or electrostatic coating the precursor powder onto a substrate 120. The spray coating may be applied by a spray gun in an electrostatic field or with a triboelectric gun in which the powder is charged by friction.

After the precursor powder is spray coated onto the substrate 120, the resulting spray coating is cured by heating in an oven at a curing temperature that is above the deblocking and reaction temperature of the precursor mixture. The curing temperature may range from about 160° C. to 210° C. Curing may occur for a period of time sufficient for the binder and cross-linker to fully react, thereby forming the fully cured powder coating that is the first coating 130. The curing may occur for a period of time ranging from 15 to 30 minutes for temperature ranging from about 160° C. to 190° C. In other embodiments, the curing may occur for a period of time ranging from about 6 to 15 minutes for temperatures ranging from about 190° C. to 210° C. The resulting powder coating has a thickness ranging from 40 μm to 120 μm—including all sub-ranges and thicknesses there-between.

The resulting substrate coated with the antimicrobial coating is suitable as an antimicrobial article, such as a building panel for installation in interior room environments, whereby the building panel not only exhibits superior resistance to bacterial, mold, and fungal growth, but excels as reducing the amount of pre-existing viable microbial.

After providing the substrate 120 coated with the first coating 130 applied thereto, the upper surface of the first coating 130 may be coated with the second coating 140. The second coating 140 may be formed by applying a liquid-based coating composition to the upper surface 131 of the first coating 130 and then drying the liquid-based coating composition to form the second coating 140 atop the first coating 130. The liquid-based coating composition may be prepared by mixing together a liquid carrier with a repellant component. The repellant component may be a fluoro-containing repellent component. The fluoro-containing repellent component may be selected from fluoropolymer, the aforementioned fluorosurfactants, or a combination thereof. In a preferred embodiment, the fluoro-containing repellent component is an ionic fluorosurfactant.

The liquid carrier may be selected from water, VOC solvent, and combinations thereof. In a preferred embodiment, the liquid carrier is water. The fluoropolymer may be selected from fluorinated acrylic copolymer, fluorinated acrylic alkylamino copolymer, and combinations thereof. The molecular weight of the fluoropolymer may range from about 1,000 Mn to about 10,000,000 Mn—including all weights and sub-ranges there-between.

Non-limiting examples of fluorinated acrylic polymer include polymer produced by polymerizing acrylate-functional monomer containing fluoride atoms and, optionally, at least one other acrylate-functional monomer that is free of fluoride atoms. Non-limiting examples acrylate-functional monomer containing a fluoride (also referred to "fluoroacrylate") atom include vinylidene fluoride, vinylfluoride, chlorotrifluoroethylene, hexafluoropropene, tetrafluoroethylene, perfluoromethylvinylether, trifluoroethylene and mixtures thereof. Non-limiting examples of acrylate-functional monomer that is free of fluoride atoms include acrylic acid, methacrylic acid, as well as acrylate and/or methacrylate esters.

The fluoropolymer of the present invention may be ionic. The fluoropolymer of the present invention may have an acidic pH that ranges from about 3 to about 6—including all pHs and sub-ranges there-between. The fluoropolymer of the present invention may have a basic pH that ranges from about 9 to about 11—including all pHs and sub-ranges there-between. In some embodiments, the fluoropolymer may be anionic and have a pH that ranges from about 9 to about 11—including all pHs and sub-ranges there-between. In some embodiments, the fluoropolymer may be cationic and have a pH that ranges from about 3 to about 6—including all pHs and sub-ranges there-between. As discussed further herein, it has surprisingly been discovered that non-ionic fluoropolymer does not provide dirt and oil repellency as well as the ionic fluoropolymers provided herein.

In a non-limiting example, a cationic fluoropolymer may be produced by copolymerizing a fluoro-acrylate with a monomer capable of forming a salt, whereby the covalently bonded group formed from the monomer has a positive charge—e.g., such as N-dimethylaminoethyl methacrylate acid, whereby the amino group is reacted with diethyl sulphate to form a cationic group pendant from the fluoropolymer.

In a non-limiting example, a cationic fluoropolymer may be produced by copolymerizing a fluoro-acrylate with a monomer capable of forming a salt, whereby the covalently bonded group formed from that monomer has a negative charge—e.g., such as methacrylic acid, whereby the carboxylic acid group is reacted with ammonia to form an anionic group pendant from the fluoropolymer.

The liquid carrier may be present in an amount ranging from about 80 wt. % to about 99.98 wt. %—based on the total weight of the liquid-based coating composition—including all percentages and sub-ranges there-between. The fluoropolymer may be present in an amount ranging from about 0.02 wt. % to about 20 wt. % based on the total weight of the liquid-based coating composition—including all percentages and sub-ranges there-between.

The liquid-based coating composition may be applied to the upper surface 131 of the first coating 130 by spray coating, roll coating, dip coating, or wiping. The liquid-based coating composition may be applied to the upper surface 131 of the first coating 130 in an amount ranging from about 80 g/m² to about 200 g/m²—including all sub-ranges and amounts there-between. In a preferred embodiment, the liquid-based coating composition may be applied to the upper surface 131 of the first coating 130 in an amount ranging from about 105 g/m² to about 122 g/m²—including all sub-ranges and amounts there-between. After application, the liquid-based coating composition covers both the upper surface 131 of the first coating 130 as well as penetrates and at least partially fills the voids created by the surface imperfections 135 on the first coating 130.

After application, the liquid-based coating composition is dried for a period of time ranging from about 5 min to about 60 min and at a temperature ranging from about 15° C. to about 40° C.—thereby driving off the liquid carrier and transforming the liquid-based coating composition into the second coating 140. According to the present invention, the term "drying" or "dried" refers to driving liquid carrier from a referred to composition. The term "drying" or "dried" does not refer to chemically reacting a composition with a secondary composition—e.g., chemically curing polymeric binder resin with cross-linking agent. Thus, the second coating 140 comprising the fluoropolymer may be applied to the first coating 130 without the need of additional high-temperature curing (such as used in the curing stage of the first coating 130).

After drying, the resulting second coating 140 may substantially free of all liquid-carrier. The resulting building panel 100 comprises fluoropolymer applied to the upper surface 131 of the first coating 130 in a dry-state in an amount ranging from about 0.02 g/m² to about 2 g/m²—including all sub-ranges and amounts there-between—wherein the fluoropolymer forms a topcoat for the building panel 100.

After drying the building panel 100, fluoropolymer remains applied to not only the upper surface 131 of the first coating 130 but also within the surface defects 135 of the first coating 130. Specifically, the second coating 140 comprises filling portions 145 that cause at least a portion of the fluoropolymer of the second coating 140 to be present within the surface defect 135 of the first coating 130 such that at least a portion of the fluoropolymer of the second coating 140 is located between the upper surface 131 and the lower surface 132 of the first coating 130.

The application of the second coating 140 comprising the fluoropolymer to the first coating 130 imparts added resistance to dirt pick-up resistance (e.g., finger print oils and sweat), which results in a building panel 100 that can withstand cosmetic damage that would otherwise typically occur during installation. The added resistance to dirt pick-up may be measured as a function of change in color value—i.e. "Delta E" (ΔE).

Delta E value is measured by the following calculation:

$$\Delta E = [(L_2-L_1)^2 + (a_2-a_1)^2 + (b_2-b_1)^2]^{1/2}$$

wherein $L_1$, $a_1$, and $b_1$ are each initial color values of an unsoiled first major surface 111 of a building panel 100 that are measured using a Minolta Chroma Meter CR 410 from Minolta Corporation. The $L_2$, $a_2$, and $b_2$ values are the color values as measured by the Minolta Chroma Meter CR 410 after each first major surface 111 of the building panel 100 has been soiled by a dirt composition (i.e., finger oils, sweat, etc.). A smaller ΔE value indicates improved resistance to dirt pick-up. According to the present invention, the combination of the first coating 130 and the second coating 140 can provide a building panel having a ΔE value less than 2.

Additionally, the combination of the first coating 130 and the second coating 140 may result in the first major surface 111 of the building panel having enhanced hydrophobicity. According to the present invention, the term "hydrophobicity" or "hydrophobic" means a composition that is extremely difficult to wet and is capable of repelling liquid water under atmospheric conditions. Thus, as used herein, the term "hydrophobic" refers to a surface that generates a contact angle of greater than 90° with a reference liquid (i.e. water).

The notion of using the contact angle made by a droplet of liquid on a surface of a solid substrate as a quantitative measure of the wetting ability of the particular solid has also long been well understood. Wetting is the ability of a liquid to maintain contact with a solid surface, resulting from intermolecular interactions when the two are brought together. The degree of wetting (wettability) is determined by a force balance between adhesive and cohesive forces. If the contact angle is greater than 90° for the water droplet to the substrate surface then it is usually considered to be hydrophobic.

The first major surface 111 of the building panel 100 according to the present invention exhibits a water contact angle of at least about 115°. In a preferred embodiment, the first major surface 111 of the building panel 100 exhibits a water contact angle ranging from about 125° to about 135°—including all sub-ranges and angles there-between. At this contact angle, most common waters and oils (e.g., fingerprint oils) will not wet the first major surface 111 of the building panel 100—thereby making the building panel 100 resistant to smudging during installation.

Figure 5:
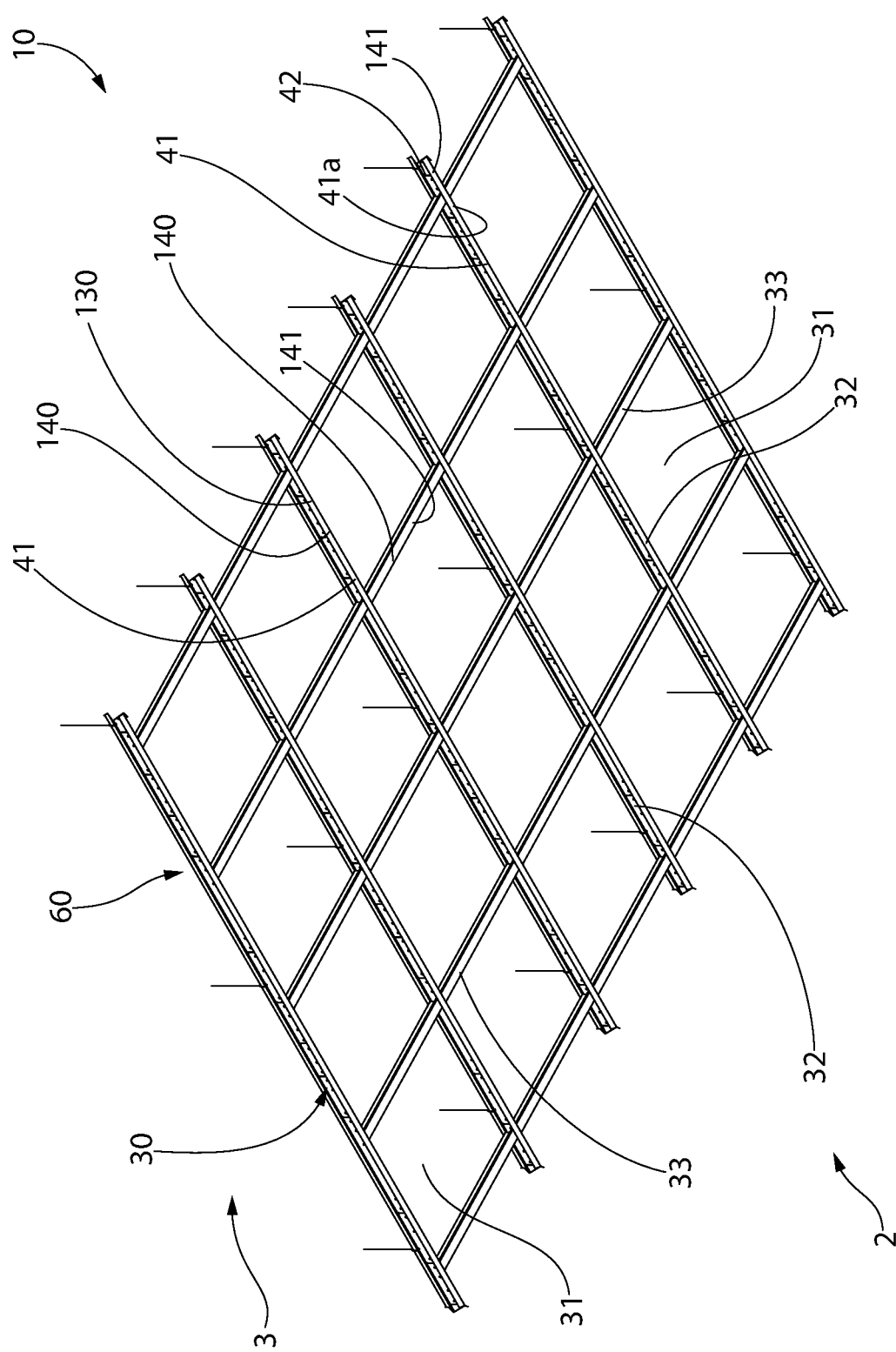
FIG. 5 is a perspective view of a building system according to an alternative embodiment of the present invention.
Figure 6:
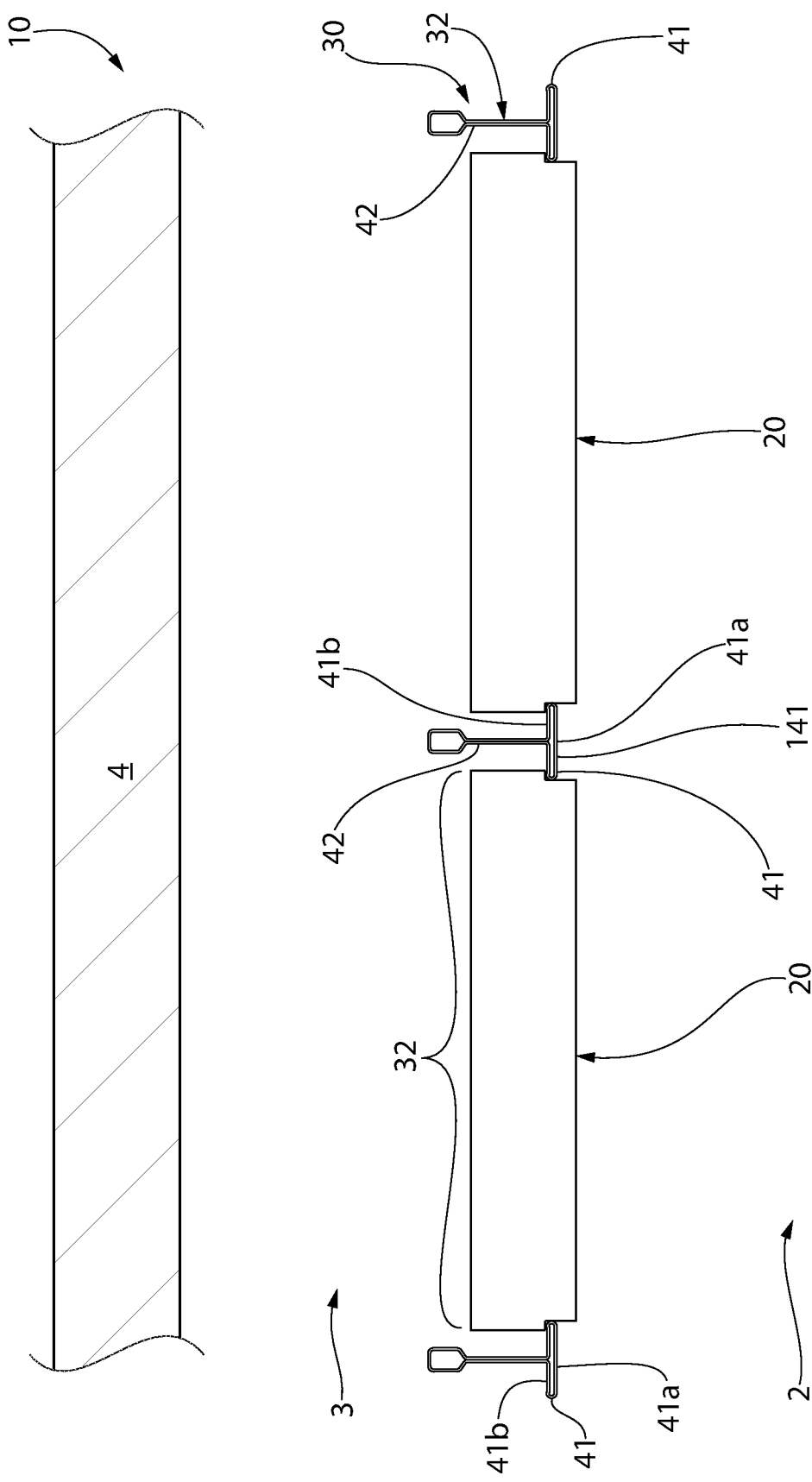
FIG. 6 is a side profile view of a portion of the ceiling system 1 according to the present invention.

Referring now to FIGS. 5 and 6, an alternative embodiment of the present invention includes a ceiling system 10 in an interior space, whereby the interior space comprises a plenum space 3 and an active room environment 2. The ceiling system 10 may comprise a support grid 30 whereby the plenum space 3 is located above the support grid 30 and below a roof or subfloor 4 of an above adjacent floor in the building. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

The support grid 30 may comprise a plurality of first support struts 32 and a plurality of second support struts 33. Each of the first support struts 32 may be parallel to each other. Each of the second support struts 33 may be parallel to each other. The plurality of first support struts 32 may be orthogonal or perpendicular to the plurality of second support struts 33, thereby forming an intersecting pattern of struts that form the support grid 30. The support grid 30 may comprise openings 31 formed by the intersecting first and second support struts 32, 33 which can receive a building panel 20, thereby forming the ceiling system 10.

At least one of the first support struts 32 and the second support struts 33 may comprise an inverted T-bar having a horizontal flange 41 and a vertical web 42. The horizontal flange 41 may comprise a lower surface 41a and an upper surface 41b—wherein the lower surface 41a faces the active room environment 2 and the upper surface 41b faces the plenum space 3 in the installed state. The lower surface 41a faces opposite the direction in which the vertical web 42 extends from the horizontal flange 41.

According to this embodiment, the first coating 130 of the present invention may be applied directly to the lower surface 41a of the horizontal flange 41 of at least one of the first and/or second support struts 33 as previously discussed. The second coating 140 may then be applied to the first coating 130, as previously discussed. The present invention may further provide for a ceiling system 10 comprising a coated support grid 60 comprising the support grid 30, the first coating 130, and the second coating 140—whereby the first coating 130 is applied to at least a portion of the upper surface 41a of horizontal flange 41 of the support grid 30 and the second coating 140 applied to the first coating 130 and whereby the upper surface 141 of the second coating 140 faces the active room environment 2.

According to the present invention, the anti-soiling articles of the present invention may be the result of one of many configurations. According to some embodiments, the article may comprise a substrate 120 coated with the first coating 130, whereby the first coating 130 comprises the liquid-based anionic fluorosurfactant. In such embodiments, the second coating 140 may optionally be present. In such embodiments, the upper surface of the first coating 130 may form a major surface of the article. In such embodiments, the second coating 140 may optionally be present, whereby the second coating 140 comprises a fluoro-containing repellent component that includes fluoropolymer, fluorosurfactant, or a combination thereof.

According to other embodiments, the anti-soiling article may comprise a substrate 120 coated with the first coating 130, whereby the first coating 130 comprises the waxy (i.e. solid) anionic fluorosurfactant. In such embodiments, the second coating 140 may optionally be present. In such embodiments, the upper surface of the first coating 130 may form a major surface of the article. In such embodiments, the second coating 140 may optionally be present, whereby the second coating 140 comprises a fluoro-containing repellent component that includes fluoropolymer, fluorosurfactant, or a combination thereof.

According to other embodiments, the anti-soiling article may comprise a substrate 120 coated with the first coating 130, whereby the first coating 130 does not comprise a fluoro-containing repellent component. In such embodiments, the article further comprises the second coating 140, whereby the second coating comprises a fluoro-containing repellent component that includes fluoropolymer, fluorosurfactant, or a combination thereof. In such embodiments, the second coating 140 forms a major surface of the article. In such embodiments, the second coating 140

The following examples are prepared in accordance with the present invention. The present invention is not limited to the examples described herein.

EXAMPLES

Anti-Soiling Test Protocol of Topcoat

The following experiment measures the oil and dirt repellency on the major surface of the building panel according to the present invention. Building panels were prepared having a polymeric powder coating that is formed from a powder coating precursor is prepared by mixing precursor components together (i.e., a polymeric binder, cross-linker, and fluorosurfactant). The fluorosurfactant has 100% solids and includes an anionic fluorosurfactant having at least one phosphate group. The anionic fluorosurfactant has a melting temperature between 50° C. and 70° C. and a pH value between 1 and 5. An exemplary suitable anionic fluorosurfactant is commercially available from Du Pont, under the tradename Capstone® FS-66.

The powder coating precursor is then melt-mixed by extruder at a temperature ranging from about 90° C. to about 110° C., followed by pelletizing the resulting extrudate into a powder. Each resulting powder is spray coated onto a first major surface of an aluminum substrate. The coated substrate is then heat cured at a temperature of 195° C. to form the powder coated substrate.

Example 1

A liquid-based coating is then applied to the top surface of the powder coating, wherein the liquid-based coating comprises 80 wt. % water and 20 wt. % of a first repellent component. The first repellent component being a cationic fluorosurfactant having a pH ranging from about 4 to about 6 and a density of 1.06 g/cm$^3$. The liquid-based coating is applied in an amount of 10 g/m2 onto the powder coating. The resulting liquid-based coating was then dried at a temperature between 15° C. and 40° C. to form the building panel of Example 1. The resulting building panel of Example 1 has fluorosurfactant applied atop the powder coating in an amount of about 2 g/m$^2$.

Example 2

A second building panel (Example 2) was prepared according to the same methodology of Example 1, except that the liquid-based coating composition was diluted to a concentration of 0.2 wt. % of a second repellent component. The second repellent component being an anionic fluorosurfactant having a pH ranging from about 9 to about 11 and a density of about 1.1 g/cm$^3$. The liquid-based coating composition was then applied to the fluorosurfactant containing powder coating at a rate of 10 g/m2, and the liquid-based coating composition was dried. The resulting building panel of Example 2 has fluorosurfactant applied atop the powder coating in an amount of about 0.02 g/m$^2$.

Comparative Example 1

A third building panel (Comparative Example 1) was prepared according to the same methodology of Example 2, except that a first non-ionic fluorosurfactant is used in place of the second repellent component. The non-ionic fluorosurfactant has a pH ranging from about 7 to about 8.5 and a density of about 1.4 g/cm3—commercially available as FS-3100 from DuPont. The resulting building panel of Comparative Example 1 has 0.02 g/m$^2$ of fluorosurfactant applied atop the powder coating.

Comparative Example 2

A fourth building panel (Comparative Example 2) was prepared according to the same methodology of Example 2, except that a second non-ionic fluorosurfactant is applied to the powder coating. The second fluorosurfactant has a pH ranging from about 7 to about 9 and a density of about 1.1 g/cm$^3$—commercially available as FS-65 from DuPont. The resulting building panel of Comparative Example 1 has 0.02 g/m$^2$ of fluorosurfactant applied atop the powder coating.

The building panels of Examples 1 and 2 as well as Comparative Examples 1 and 2 were then compared for oil and dirt repellency according to the follow methodology. A dirt composition is prepared including peat moss, Portland Cement, calcined kaolinite, and Sno-Brite Clay. The Sno-Brite Clay includes >95 wt. % Kaolin as well as minor amounts of silica (quartz, cristobalite), mica, and titanium dioxide.

Each of the building panels of Example 1 and Comparative Example 1 are positioned such that the powder coated surface faces upward. An amount (0.2 grams) of the dirt composition of Table 1 is then placed into a plastic cup and held over the powder coated surface, where the plastic cup is tapped allowing the dirt composition to fall naturally onto the upward facing powder coated surface of the dirt repellant panel. Except for the dirt composition that is applied to the powder coated surface, the dirt repellant panel remains untouched. The soiled building panels are then left for a period of 24 hours.

After the period of 24 hours, the building panels are flipped upside down (180°) causing the powder coated surface to face downward, allowing the loose dirt composition to fall off the powder coated surface of the dirt repellant panel. The surface of the building panels that are opposite the powder coated surface is then tapped 20 times causing additional dirt composition to fall off the building panels. The building panels are then turned half way back (90°) such that the powder coated surface of the building panels are facing sideways, followed by tapping the side of the building panels 10 times. The building panels are then turned back to the original position such that the powder coated surface is facing upwards, whereby that surface is then measured for a change in color value—i.e. "Delta E" (ΔE), as previously discussed.

Specifically, the $L_2$, $a_2$, and $b_2$ values are the color values as measured by the Minolta Chroma Meter CR 410 after each sample is soiled by the dirt composition, as previously discussed. The control value for each color test is the same color and construction without any application of the dirt composition. The various color readings are taken at three different areas on the sample, and the average Delta E is recorded—as shown in Table 1.

TABLE 1

|  | Ex. 1 | Ex. 2 | Comp. Ex. 1 | Comp. Ex. 2 |
| --- | --- | --- | --- | --- |
| Ionic fluorosurfactant in powder coating | 1 wt. % | 1 wt. % | — | — |
| Non-ionic fluorosurfactant in powder coating | — | — | 1 wt. % | 1 wt. % |
| Ionic fluorosurfactant applied to powder coating | 2 g/m$^2$ | 0.02 g/m$^2$ | 0.02 g/m$^2$ | 0.02 g/m$^2$ |
| ΔE | 2.2 | 2.5 | 4.8 | 6.2 |

As demonstrated by Table 1, the combination of the cationic fluorosurfactant in the topcoating applied to a powder coating comprising the anionic fluorosurfactant provides an unexpected improvement in dirt and oil repellency of the building panel as compared to other top coatings applied to powder coatings that comprise a non-ionic fluorosurfactant—as evidenced by a smaller Delta E value—in as little of an amount as 0.02 g/m$^2$.

Anti-Soiling Test Protocol of Liquid Fluorosurfactant in Powder Coating

The following experiment measures the oil and dirt repellency on the major surface of the building panel according to the present invention using liquid-based fluorosurfactants in powder coatings. In performing this experiment, a series of building panels were prepared with powder coatings applied thereto. A first building panel (Control 1) was prepared having a powder coating with no fluorosurfactant. The building panel of Control 1 does not include a top-coating.

A second building panel (Example 3) was prepared with a powder coating formed from a precursor that included a waxy (i.e. 100% solids) anionic fluorosurfactant. The powder coating of Example 3 was prepared according to the same methodology as the powder coatings of Examples 1 and 2—including the same anionic fluorosurfactant. The building panel of Example 3 does not include a top-coating.

Three additional building panels (Examples 4-6) were prepared with a powder coating formed from a precursor that included a liquid-based anionic fluorosurfactant. The powder coatings of Examples 4-6 were prepared by blending together the precursor components (i.e., polymeric binder, cross-linker, and liquid-based anionic fluorosurfactant) in a blender at a temperature below 120° F. After blending, the blended precursor mixture passed through an extruder at a temperature ranging from about 90° C. to about 110° C., whereby the liquid carrier present on the liquid-based anionic fluorosurfactant was evaporated from the precursor. Subsequently, the resulting extrudate was pelletized into a powder. Each resulting powder is spray coated onto a first major surface of an aluminum substrate. The coated substrate is then heated to a temperature causing the cross-linker and the polymeric binder to covalently bond, thereby providing a cross-linked powder coating atop the substrate.

Two additional building panels (Comparative Examples 3 and 4) were prepared with a powder coating formed from a precursor that included a liquid-based non-ionic fluorosurfactant. The powder coatings of Comparative Examples 3 and 4 were prepared according to the same methodology as Examples 4-6 except that the liquid based fluorosurfactant is non-ionic instead of anionic.

Regarding the building panels of Example 3-6 and Comparative Examples 3 and 4, the specific amount of liquid-based fluorosurfactant in each precursor mixture was selected such that the resulting powder coating contained the same relative amount of solid fluorosurfactant in the final powder coating. Therefore, while the solids content of each liquid-based fluorosurfactant of Examples 3-6 and Comparative Examples 3 and 4 may differ in the precursor, the final building panels provide an accurate side-by-side comparison as the dry (i.e., solid) amount of fluorosurfactant between panels is the same.

The resulting building panels of Control 1, Examples 3-6, and Comparative Example 3 and 4 were then subjected the dirt and oil repellency test as set forth with respect to Examples 1 and 2. The results of the dirt and oil repellency test for each building panel is set forth below in Table 2.

Anti-Bacterial Testing Protocol

The anti-bacterial testing protocol was used to prepare and test the building panel samples of Examples 7-13, Comparative Examples 5-11, and Controls 2-8. Each building panel sample was prepared by applying a powder coating composition atop a 50 mm×50 mm metal substrate. Each of the powder coating compositions comprise a blend of polymeric resin precursor, cross-linker, and pigment and have a solids content of at least 99%.

The powder coating composition of the present invention (i.e., Examples 7-13) includes an antimicrobial composition of 7 pbw of zinc borate and 0.1 pbw of 2-(4-thiazolyl) benzimidazole based on 100 parts of the overall powder coating composition. The powder coating composition of Comparative Examples 5-11 does not include the antimicrobial composition of the present invention, but rather an antimicrobial composition of silver nitrate. The powder coating composition of Controls 2-8 included no antimicrobial composition.

Once applied to the metal substrate, each powder coating composition was heated above the curing temperature causing the polymeric resin precursor to react with the cross-linker and form a cross-linked powder coating.

Several tests were performed to measure the antibacterial efficacy of the cross-linked powder coatings. Each test included a total of three Petri dishes, whereby the first Petri dish contained one of the inventive building panel samples (i.e., one of Examples 7-13), the second Petri dish contained one of the comparative building samples (i.e., one of Comparative Examples 5-11), and the third Petri dish contained one of the control building panel samples (i.e., one of Controls 2-8). Each Petri dish was inoculated with bacteria at specific concentration then covered with sterile plastic to spread the inoculum evenly over each sample surface. The

TABLE 2

| Example | Fluorosurfactant Solid's Content in the Precursor Mixture | Type | Charge | L | a* | b* | ΔE |
|---|---|---|---|---|---|---|---|
| Control 1 | — | — | — | 94.52 | −1.18 | 1.68 | 14.11 |
| Ex. 3 | 100% | Wax | Anionic | 95.00 | −0.50 | 1.5 | 0.64 |
| Ex. 4 | 13%-15% | Liquid | Anionic | 95.10 | −0.96 | 1.52 | 0.37 |
| Ex. 5 | 25% | Liquid | Anionic | 94.79 | −0.84 | 3.60 | 1.29 |
| Ex. 6 | 28% | Liquid | Anionic | 95.43 | −0.94 | 1.70 | 1.51 |
| Comp. Ex. 3 | 33% | Liquid | Non-ionic | 94.39 | −1.12 | 3.35 | 4.92 |
| Comp. Ex. 4 | 50% | Liquid | Non-ionic | 92.65 | −1.20 | 3.51 | 9.44 |

As demonstrated by Table 2, the use of liquid-based anionic fluorosurfactants in the powder coatings of the present invention provide an unexpected improvement in dirt and oil repellency as compared to other types of non-ionic fluorosurfactants, which is reflected by the low ΔE of the building panels of Examples 4-6 compared to that of Comparative Examples 3 and 4. Furthermore, the incorporation of the liquid-based anionic fluorosurfactants according to the methodology of the present invention avoids issues of clumping and improper distribution of the fluorosurfactant throughout the precursor as demonstrated by the ΔE of the building panels of Examples 4-6, which is the same if not lower than that of the building panel of Example 3 formed from a solid fluorosurfactant. The successful incorporation of liquid-based fluorosurfactants into a powder coating composition goes against the previously accepted wisdom in the art, which was to avoid using liquid-containing components when forming powder coating compositions that are required to be solid when applied to a substrate.

samples were incubated at 35° C. and a relative humidity of 90%. The bacteria concentration was measured in each Petri dish at an initial time (t=0) and again after a pre-determined time period of 24 hours (t=24).

After the 24-hour time period, the bacterial colonies on each test sample were counted and recorded. The value of the antimicrobial activity of each sample was calculated according to the formula listed below and recorded as log reduction as follows:

90% reduction=1 log reduction (i.e., 1,000,000 reduced to 100,000 is a 1 log reduction)

99% reduction=2 log reduction (i.e., 1,000,000 reduced to 10,000 is a 2 log reduction)

99.9% reduction=3 log reduction (i.e., 1,000,000 reduced to 1,000 is a 3 log reduction)

99.99% reduction=4 log reduction (i.e., 1,000,000 reduced to 100 is a 4 log reduction)

99.999% reduction=5 log reduction (i.e., 1,000,000 reduced to 10 is a 5 log reduction)

The performance of the antimicrobial coatings was normalized into an antibacterial activity ("R"), which is calculated according to the following:

$$R=(U_t-U_o)-(A_t-U_o)=U_t-A_t$$

Whereby

R: antimicrobial activity $U_o$: average of logarithm numbers of viable bacteria from Control at t=0

$U_t$: average of logarithm numbers of viable bacteria from Control at t=24

$A_t$: average of logarithm numbers of viable bacteria from test sample at t=24

According to the present invention, the antimicrobial coating is deemed to have anti-bacterial effectiveness when the anti-bacterial activity is 2.0 or greater. The results of each bacteria testing are provided herein.

Anti-Bacterial Efficacy Against *Staphylococcus aureus*

A test measuring the efficacy against the *Staphylococcus aureus* bacteria was performed at a starting bacteria concentration of $9.7\times10$ CFU/mL. The results of the first test using *Staphylococcus aureus* are shown below in Table 3.

TABLE 3

| S. aureus | Ex. 7 | Comp. Ex. 5 | Control 2 |
| --- | --- | --- | --- |
| Average Log Number of Viable Bacteria @ 24 hours | −0.20 | 3.74 | 4.57 |
| R Value | 4.77 | 0.83 | — |
| Reduction in Bacteria | 99.99% | 85% | — |

The antimicrobial coating according to the present invention (Ex. 7) exhibited a 99.99% reduction in bacterial colonies, resulting in an R value of 4.77—well above the 2.0 threshold for bacterial effectiveness against the *Staphylococcus aureus* bacteria. The comparative antimicrobial coating (Comp. Ex. 5) exhibited only an 85% reduction, resulting in an R value of 0.83, well below the 2.0 R value threshold.

The test for efficacy against the *Staphylococcus aureus* bacteria was repeated at a lower starting bacteria concentration of $7.5\times10^5$ CFU/mL. The results are presented in Table 4.

TABLE 4

| S. aureus NCTC# 10442 | Ex.8 | Comp. Ex. 6 | Control 3 |
| --- | --- | --- | --- |
| Average Log Number of Viable Bacteria @ 24 hours | −0.20 | 3.77 | 5.26 |
| R Value | 5.26 | 1.49 | — |
| Reduction in Bacteria | 99.99% | 97% | — |

The antimicrobial coating of the present invention (Ex. 8) again exhibited up to a 99.99% reduction in bacterial activity, resulting in an R value of 5.26 against the *Staphylococcus aureus* bacteria. The comparative antimicrobial coating (Comp. Ex. 6) exhibited only a 97% reduction, resulting in an R value of 1.49, below the 2.0 threshold.

Anti-Bacterial Efficacy Against *Escherichia coli*

A test measuring the efficacy against the *Escherichia coli* bacteria was performed at a starting bacteria concentration of $7.2\times10^5$ CFU/mL. The results are presented in Table 5.

TABLE 5

| E. coli ATCC #8739 | Ex. 9 | Comp. Ex. 7 | Control 4 |
| --- | --- | --- | --- |
| Average Log Number of Viable Bacteria @ 24 hours | −0.20 | −0.20 | 2.67 |
| R Value | 2.87 | 2.87 | — |
| Reduction in Bacteria | 99.8% | 99.8% | — |

At this concentration, the antimicrobial coating of the present invention (Ex. 9) as well as the comparative coating (Comp. Ex. 7) both exhibited up to a 99.8% reduction in bacterial colonies, resulting in an R value of 2.87, which is above the 2.0 threshold for bacterial effectiveness against the *Escherichia coli* bacteria.

The test for efficacy against the *Escherichia coli* bacteria was repeated at a higher starting bacteria concentration of $7.6\times10^5$ CFU/mL. The results are presented in Table 6.

TABLE 6

| E. coli NCTC #12900 | Ex. 10 | Comp. Ex. 8 | Control 5 |
| --- | --- | --- | --- |
| Average Log Number of Viable Bacteria @ 24 hours | −0.20 | 5.68 | 6.06 |
| R Value | 6.26 | 0.39 | — |
| Reduction in Bacteria | 99.99% | 58% | — |

The antimicrobial coating of the present invention (Ex. 10) exhibited up to a 99.99% reduction in bacterial activity, resulting in an R value of 6.26 against the *Escherichia coli* bacteria. However, the comparative antimicrobial coating (Comp. Ex. 8) exhibited only a 58% reduction, resulting in an R value of 0.39, well below the 2.0 R value threshold.

Anti-Bacterial Efficacy Against *Bacillus cereus*

A test measuring efficacy against the *Bacillus cereus* bacteria was performed at a starting bacteria concentration of $4.1\times10^5$ CFU/mL. The results are presented in Table 7.

TABLE 7

| B. cereus NCTC #11143 | Ex. 11 | Comp. Ex. 9 | Control 6 |
| --- | --- | --- | --- |
| Average Log Number of Viable Bacteria @ 24 hours | 2.64 | 4.35 | 4.95 |
| R Value | 2.31 | 0.60 | — |
| Reduction in Bacteria | 99.5% | 75% | — |

The antimicrobial coating of Example 11 exhibited up to a 99.5% reduction in bacterial colonies, resulting in an R value of 2.31—which is above the 2.0 threshold for bacterial effectiveness against the *Bacillus cereus* bacteria. The comparative antimicrobial coating (Comp. Ex. 9) exhibited only a 75% reducing, resulting in an R value of 0.6, well below the 2.0 R value threshold.

Anti-Bacterial Efficacy Against *Acinetobachter baumannii*

A test measuring the efficacy against the *Acinetobachter baumannii* bacteria was performed at a starting bacteria concentration of $9.2\times10^5$ CFU/mL. The results are presented in Table 8.

TABLE 8

| A. Baumannii NCTC #12156 | Ex. 12 | Comp. Ex. 10 | Control 7 |
|---|---|---|---|
| Average Log Number of Viable Bacteria @ 24 hours | −0.20 | 1.62 | 5.82 |
| R Value | 6.02 | 4.20 | — |
| Reduction in Bacteria | 99.99% | 99.99% | — |

Both the antimicrobial coating of the present invention (Ex. 12) and the comparative coating (Comp. Ex. 10) exhibited up to a 99.99% reduction in bacterial colonies. However, at an R value of 6.02, the antimicrobial coating of the present invention again out-performed the comparative antimicrobial coating, which exhibited an R value of 4.2 against the *Acinetobachter baumannii* bacteria.

Anti-Bacterial Efficacy Against *Klebsiella pneumoniae*

A test measuring the efficacy against the *Klebsiella pneumoniae* bacteria was performed at a starting bacteria concentration of $6.4 \times 10^5$ CFU/mL. The results are presented in Table 9.

TABLE 9

| K. pneumonia NCTC# 9633 | Ex. 13 | Comp. Ex. 11 | Control 8 |
|---|---|---|---|
| Average Log Number of Viable Bacteria @ 24 hours | −0.20 | 0.19 | 4.24 |
| R Value | 4.44 | 4.05 | — |
| Reduction in Bacteria | 99.99% | 99.99% | — |

Both the antimicrobial coating of the present invention (Ex. 13) and the comparative coating (Comp. Ex. 11) exhibited up to a 99.99% reduction in bacterial colonies. However, at an R value of 4.44, the antimicrobial coating of the present invention out-performed the comparative antimicrobial coating, which exhibited an R value of 4.05 against the *Klebsiella pneumoniae* bacteria.

Summary of Anti-Bacterial Efficacy

The anti-bacterial efficacy of each building panel is summarized in the Table 10.

TABLE 10

|  | Concentration (CFU/mL) | Ex. 7-13 | Comp. Ex. 5-11 |
|---|---|---|---|
| *Staphylococcus aureus* | $9.7 \times 10^5$ | Effective | Non-Effective |
| *Staphylococcus aureus* | $7.5 \times 10^5$ | Effective | Non-Effective |
| *Escherichia coli* | $7.2 \times 10^5$ | Effective | Effective |
| *Escherichia coli* | $7.6 \times 10^5$ | Effective | Non-Effective |
| *Bacillus cereus* | $4.1 \times 10^5$ | Effective | Non-Effective |
| *Acinetobachter baumannii* | $9.2 \times 10^5$ | Effective | Effective |
| *Klebsiella pneumoniae* | $6.4 \times 10^5$ | Effective | Effective |

As demonstrated by Table 10, the antimicrobial additive of the present invention imparts highly effective broad spectrum bacterial resistance to the powder coatings at range of various bacteria concentrations, while the comparative antimicrobial additive works against only a select number of bacteria and the comparative antimicrobial additive being effect against those select bacteria in limited concentrations.

Anti-Mold Testing Protocol

The anti-mold protocol was used to prepare and test the sample building panels of Examples 14, 15, Comparative Example 12, and Control Example 9. Each building panel sample was prepared by applying a powder coating composition atop a 3"×4" metal substrate. Each of the powder coating compositions had a solids content of at least 99% and comprised a blend of polymeric resin precursor, cross-linker, and pigment.

The powder coating composition of the present invention (i.e., Examples 14 and 15) includes an antimicrobial composition of 7 pbw of zinc borate and 0.1 pbw of 2-(4-thiazolyl) benzimidazole based on 100 parts of the overall powder coating composition. The powder coating composition of Comparative Example 12 does not include the antimicrobial composition of the present invention, but rather an antimicrobial composition of silver nitrate. The powder coating composition of Control Example 9 included no antimicrobial composition.

Each sample was placed in a test chamber that contained soil seeded with fungal spores that were allowed to grow. Specifically, the soil was seeded with *Aspergillus niger* (ATCC #6275); *Penicillium citrinum* (ATCC #9849); and *Aureobasidium pullulans* (ATCC #9348). The chamber was held at room temperature (32.5±1° C.) and a relative humidity of 95±3% for a period of one week. After the period, each sample was removed from the test chamber and observed. The amount of defacement caused by mold formation on both the front and rear major surfaces was observed and measured. The degree of defacement was assigned to a rating scale as set forth in Table 11:

TABLE 11

| Rating | Definition |
|---|---|
| 10 | No Defacement |
| 9 | 90% Clear (1-10% Defaced) |
| 8 | 80% Clear (11-20% Defaced) |
| 7 | 70% Clear (21-30% Defaced) |
| 6 | 60% Clear (31-40% Defaced) |
| 5 | 50% Clear (41-50% Defaced) |
| 4 | 40% Clear (51-60% Defaced) |
| 3 | 30% Clear (61-70% Defaced) |
| 2 | 20% Clear (71-80% Defaced) |
| 1 | 10% Clear (81-90% Defaced) |
| 0 | 0% Clear (91-100% Defaced) |

The defacement of each sample, as well as control samples which contained powder coatings applied to a substrate, except the powder coatings did not comprise the antimicrobial composition, were observed after each week. The results of the experiment are set forth below in Table 12.

TABLE 12

|  | Week 1 | Week 2 | Week 3 | Week 4 |
|---|---|---|---|---|
| Ex. 14 | 10/10 | 10/10 | 10/10 | 10/10 |
| Ex. 15 | 10/10 | 10/10 | 10/10 | 10/10 |
| Comp. Ex. 12 | 10/10 | 10/10 | 10/10 | 10/10 |
| Control 9 | 10/10 | 10/10 | 10/10 | 10/10 |

As demonstrated by Table 12, the antimicrobial coating composition performs adequately against mold-growth over the period of 4 weeks against other powder coatings.

What is claimed is:

1. An article comprising:
   a substrate;
   a powder coating having an upper surface opposite a lower surface, the lower surface facing the substrate; and
   wherein the powder coating is formed from a precursor comprising a blend of polymeric binder, cross-linker, and fluorosurfactant composition comprising anionic fluorosurfactant, and water; wherein the polymeric binder is substantially free of PVDF polymer; and wherein the anionic fluorosurfactant is present in an amount ranging from about 13% to 15% based on the total weight of the precursor composition.

2. The article of claim 1, wherein the powder coating has a thickness ranging from about 50 μm to about 120 μm.

3. The article according to claim 1, wherein the anionic fluorosurfactant is present in amount ranging from about 0.05 wt. % to about 4.0 wt. % based on the total weight of the powder coating.

4. The article according to claim 3, wherein powder coating further comprises a pigment, and wherein fluorosurfactant is present in an amount ranging from about 10 wt. % to about 25 wt. % based on the total weight of the pigment.

5. The article according to claim 1, wherein the fluorosurfactant has a melting temperature ranging from about 50° C. to about 70° C.

\* \* \* \* \*